United States Patent
Hayashi et al.

(10) Patent No.: US 8,005,052 B2
(45) Date of Patent: Aug. 23, 2011

(54) RADIO RESOURCE ALLOCATION SYSTEM AND ROADSIDE EQUIPMENT

(75) Inventors: Hiroki Hayashi, Kawasaki (JP); Hideki Inaba, Kawasaki (JP); Yusuke Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/333,897

(22) Filed: Dec. 12, 2008

(65) Prior Publication Data
US 2009/0154379 A1    Jun. 18, 2009

(30) Foreign Application Priority Data

Dec. 18, 2007  (JP) ................................ 2007-326257

(51) Int. Cl.
*H04B 7/212* (2006.01)
*H04M 11/00* (2006.01)
(52) U.S. Cl. ......... 370/337; 370/347; 455/421; 455/424
(58) Field of Classification Search ........................ None
See application file for complete search history.

(56) References Cited

U.S. PATENT DOCUMENTS

| 2004/0203767 | A1* | 10/2004 | Fraser et al. | 455/435.1 |
| 2005/0168350 | A1 | 8/2005 | Tauchi | |
| 2005/0226201 | A1* | 10/2005 | McMillin | 370/348 |
| 2007/0293224 | A1* | 12/2007 | Wang et al. | 455/436 |

FOREIGN PATENT DOCUMENTS

| JP | 2003-179543 | 6/2003 |
| JP | 2005-236952 | 9/2005 |
| JP | 2006-121683 | 5/2006 |

* cited by examiner

*Primary Examiner* — Jianye Wu
(74) *Attorney, Agent, or Firm* — Staas & Halsey LLP

(57) ABSTRACT

A radio resource allocation system in which equipment placed on a road allocates a radio resource to in-vehicle equipment that exists in a given area is provided. The radio resource allocation system includes the in-vehicle equipment mounted on a vehicle that communicates with another in-vehicle equipment by using the radio resource. The in-vehicle equipment includes a signal transmitting unit that transmits a signal showing that the own vehicle exists in the given area. The roadside equipment includes a radio resource allocation unit that allocates the radio resource to the in-vehicle equipment when the roadside equipment receives the signal transmitted by the signal transmitting unit, and a radio resource release unit that releases the radio resource when the roadside equipment does not receive the signal from the in-vehicle equipment that is allocated the radio resource by the radio resource allocation unit.

9 Claims, 24 Drawing Sheets

FIG. 4

| VEHICLE ID | ROAD-VEHICLE AREA-IN/OUT | ALLOCATION TS |
|---|---|---|
| YOKOHAMA×× A××-×× | IN | TS#0 |
| ITS-xxx-FUJITSU-xxxx | OUT | TS=off |
| xxx.xxx.xxx.xxx | IN | TS#2 |
| ⋮ | ⋮ | ⋮ |

A VEHICLE ID MAY BE NUMBER PLATE INFORMATION,
A VEHICLE- SPECIFIC NUMBER, AN IP ADDRESS
AND THE LIKE OF THE IN-VEHICLE EQUIPMENT.

RADIO RESOURCE ALLOCATION SYSTEM AND ROADSIDE EQUIPMENT

CROSS-REFERENCE TO RELATED APPLICATION

This application is related to and claims priority to Japanese patent application no. 2007-326257 filed on Dec. 18, 2007 in the Japan Patent Office, and incorporated by reference herein.

BACKGROUND

1. Field

The embodiments herein are directed to a radio resource allocation release system and roadside equipment and in-vehicle equipment that can communicate with another in-vehicle.

2. Description of the Related Art

Conventionally, an ITS (Intelligent Transport Systems), integrating a road and a vehicle, has been known to attempt to improve safety, transportation efficiency and comfort. For example, conventionally, a system attempts to achieve these improvements by road-vehicle communication performed between a base station (roadside equipment) placed on the road and a mobile station (in-vehicle equipment) mounted on the vehicle and by vehicle-vehicle communication performed between the mobile stations.

For example, conventionally in road-vehicle communication by spot communication for limiting a communication area as a road-vehicle area, in a synchronous time-division communication full-duplex communication uses different frequencies for communication from the base station to the mobile station and for communication from the mobile station to the base station, and a communication frame is time-divided into fixed-length sections called slots. The communication is performed between a single base station and a plurality of mobile stations.

To perform the communication by using the synchronous time-division communication system, the base station (roadside equipment) needs to allocate the slot as the radio resource to the mobile station (in-vehicle equipment). For example, conventionally, a method for allocating the radio resource to the in-vehicle equipment by the roadside equipment, the roadside equipment inquires each in-vehicle equipment of necessity of the radio resource, and then each in-vehicle equipment notifies the roadside equipment of this response.

In the above described technique for allocating the radio resource to each in-vehicle equipment, the roadside equipment allocates the radio resource to each in-vehicle equipment that responds to inquiry for necessity of the radio resource no matter whether or not the in-vehicle equipment exists in the road-vehicle area covered by the roadside equipment. However, the radio resource may be allocated to the in-vehicle equipment that exists outside of the road-vehicle area according to a request of the in-vehicle equipment, so that the radio resource may be depleted. Therefore, problems may occur in that the radio resource may not be allocated to the in-vehicle equipment that newly enters an area, and the in-vehicle equipment is therefore unable to perform communication in the area.

SUMMARY

It is an aspect of the embodiments discussed herein to address the above described problems and perform communication in an area by releasing the radio resource of the in-vehicle equipment that comes out of the road-vehicle area to prevent the radio resource from being depleted, and by performing radio resource allocation for the in-vehicle that provides service-in in the road-vehicle area.

As for this device, in the given area where the in-vehicle equipment mounted on the vehicle communicates with another in-vehicle equipment by using the radio resource, the roadside equipment placed on the road allocates the radio resource to the in-vehicle equipment that exists in the given area. When the in-vehicle equipment allocated the radio resource comes out of the given area, the in-vehicle equipment, which includes a signal transmitting unit, may transmit a signal showing that the own vehicle exists in the given area to the roadside equipment in the radio resource allocation release system in which the roadside equipment releases the radio resource. When receiving the signal transmitted by the signal transmitting unit, the roadside equipment includes a radio resource allocation unit that allocates the radio resource to the in-vehicle equipment. When not receiving a signal from the in-vehicle equipment allocated the radio resource by the radio resource allocation unit, the roadside equipment includes a radio resource release unit that releases the radio resource.

The roadside equipment and the in-vehicle equipment may detect an road-vehicle area end, allocate the radio resource to the in-vehicle equipment that provides service-in in the road-vehicle area, and then perform radio resource allocation release for the in-vehicle equipment that provides service-out of the road-vehicle area. Thus, it is possible to perform the communication in the area to prevent the radio resource from being depleted. Then radio resource allocation is performed for the in-vehicle equipment that provides service-in in the road-vehicle area. This makes it possible to perform the communication in the area.

Additional aspects and advantages of the embodiment will be set forth in part in the description which follows, and in part will be obvious from the description, or may be learned by practice of the embodiment. The aspect and advantages if the embodiment will be realized and attained by means of the elements and combinations particularly pointed out in the appended claims. These together with other aspects and advantages which will be subsequently apparent, reside in the details of construction and operation as more fully hereinafter described and claimed, reference being had to the accompanying drawings forming a part hereof wherein like numerals refer to like parts throughout.

It is to be understood that both the foregoing general description and the following detailed description are exemplary and explanatory only and are not restrictive of the embodiments, as claimed.

BRIEF DESCRIPTION OF THE DRAWINGS

FIG. 4 illustrates a management table.

DETAILED DESCRIPTION OF THE EMBODIMENTS

With reference to attached drawings, detailed description will be made below of an embodiment of a radio resource allocation release system and a roadside equipment according to the present invention.

[A configuration and a processing flow of the radio resource allocation release system according to an exemplary embodiment is disclosed. An example case when a response signal is used, as a signal showing whether the own vehicle exists in a road-vehicle area, to respond to a health check signal. An example case is when the road-vehicle area is a range in which an in-vehicle equipment receives the health check signal from the roadside equipment, and then transmits, to a roadside equipment, the response signal to respond to the health check signal.

Figure 1:
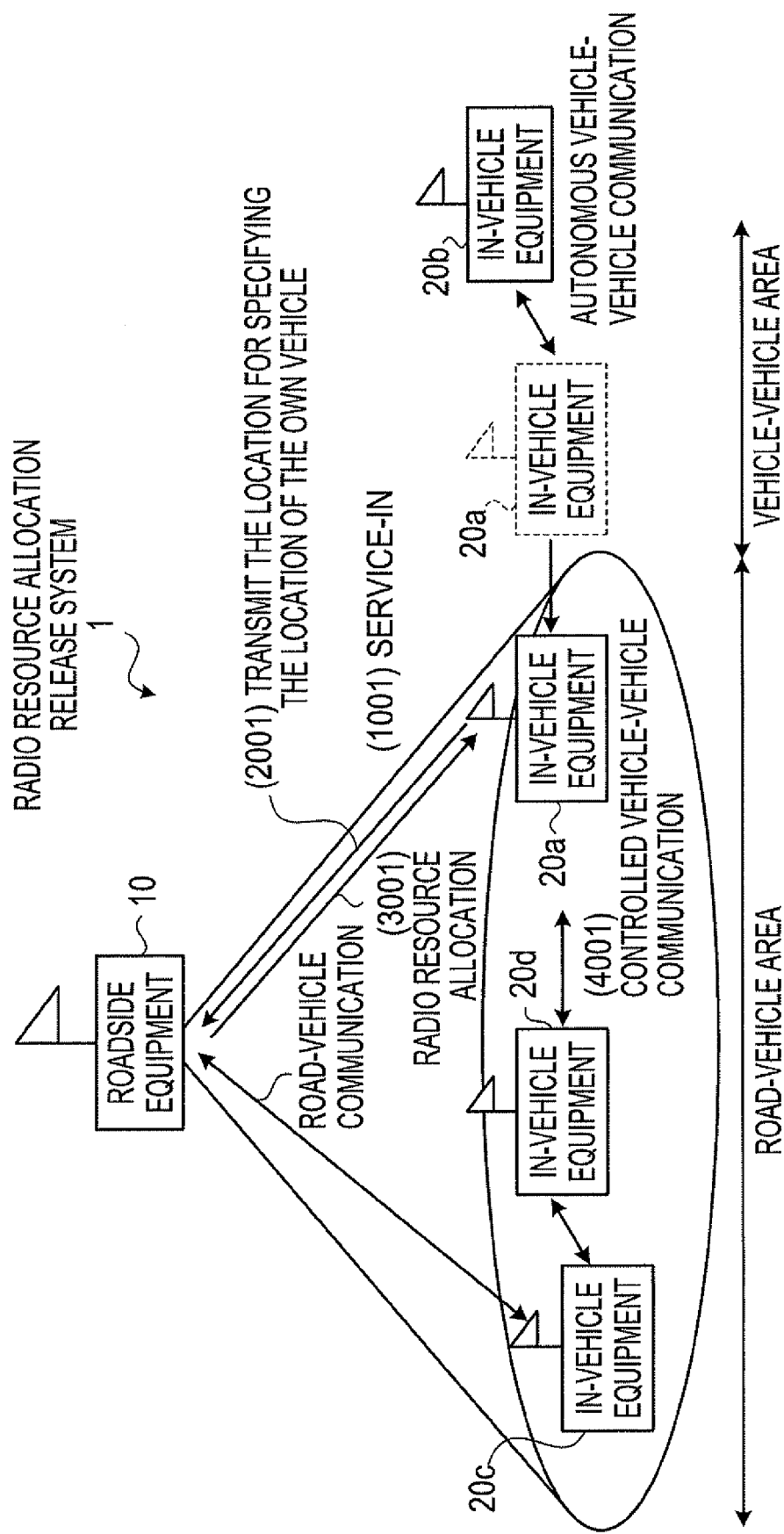
FIG. 1 illustrates a radio resource allocation release system according to an exemplary embodiment.
Figure 2:
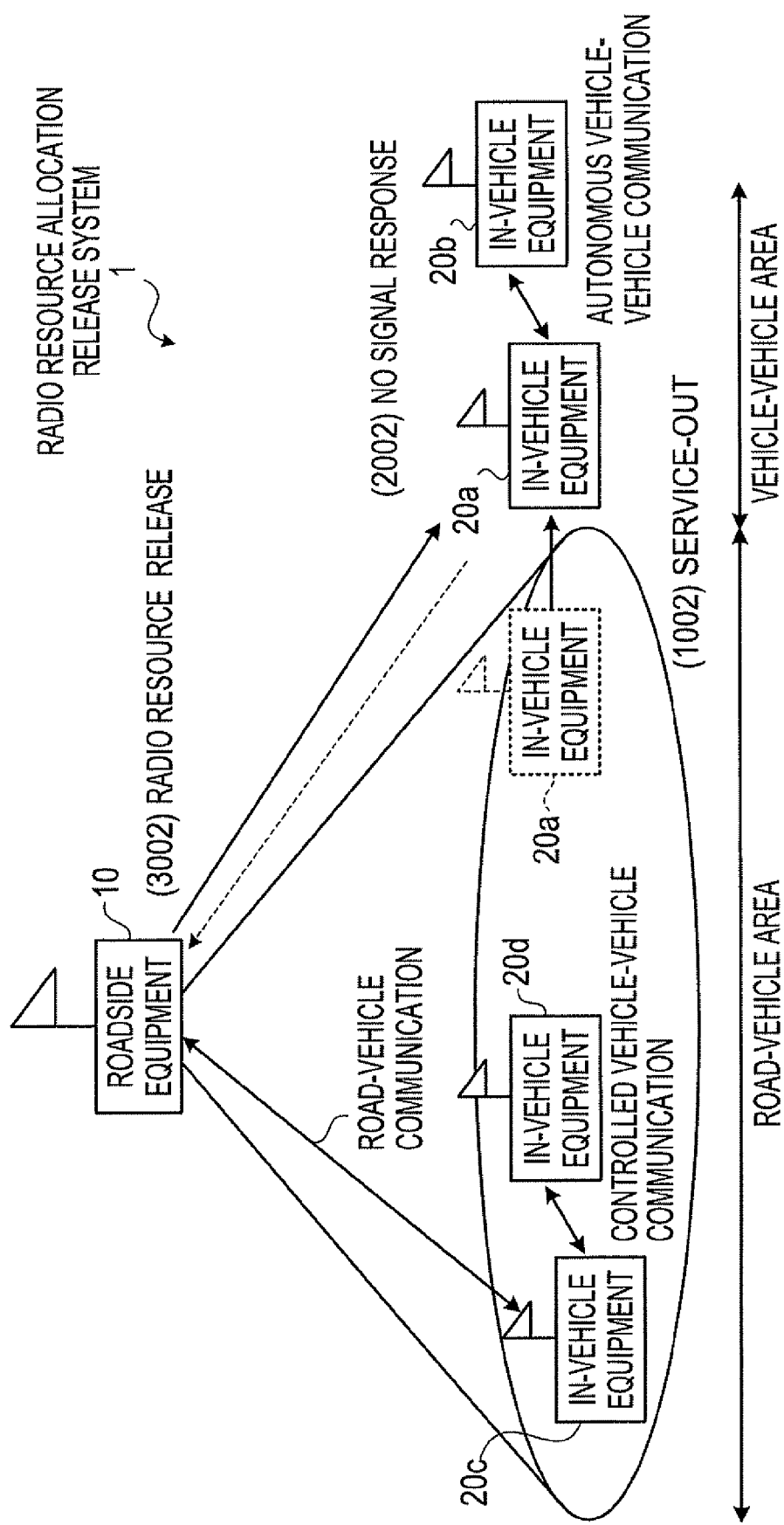
FIG. 2 illustrates a radio resource allocation release system.

FIG. 1 and FIG. 2 illustrate a radio resource allocation release system.

As for a radio resource allocation release system 1 of a first exemplary embodiment, in the road-vehicle area where the in-vehicle equipment mounted on a vehicle communicates with another in-vehicle equipment by using a radio resource, the roadside equipment placed on a road allocates the radio resource to the in-vehicle equipment that exists in the road-vehicle area. When the in-vehicle equipment allocated the radio resource comes out of the road-vehicle area, the roadside equipment releases the radio resource. Then the radio resource allocation release system 1 prevents the radio resource from being depleted and performs the radio resource allocation for the in-vehicle equipment that provides service-in in the road-vehicle area. This makes it possible to perform the communication in the area.

As shown in FIG. 1, in the radio resource allocation release system 1, areas include: a "road-vehicle area" for performing controlled vehicle-vehicle communication and road-vehicle communication, and a "vehicle-vehicle area" for performing autonomous vehicle-vehicle communication. When an in-vehicle equipment 20 enters the road-vehicle area, a roadside equipment 10 allocates the radio resource for performing the vehicle-vehicle communication in the road-vehicle area. Then the in-vehicle equipment 20 performs the vehicle-vehicle communication by the radio resource allocated by the roadside equipment 10.

Under such environment, the in-vehicle equipment 20 of the radio resource allocation release system 1 transmits, to the roadside equipment 10, a signal showing whether or not the own vehicle exists in the road-vehicle area. As illustrated in FIG. 1, when the own vehicle provides service-in in the road-vehicle area from the vehicle-vehicle area (1001), and then receives the health check signal for checking a communication state, regularly transmitted from the roadside equipment 10, an in-vehicle equipment 20a recognizes that the own vehicle enters the service area, and then provides feedback of a health check response signal to the roadside equipment 10 (2001).

When receiving the signal, transmitted from the in-vehicle equipment 20, showing that the own vehicle exists in the road-vehicle area, the roadside equipment 10 allocates the radio resource to the in-vehicle equipment 20. Specifically, when receiving the health check response signal from the in-vehicle equipment 20a, the roadside equipment 10 performs allocation processing of time slot for the vehicle-vehicle communication for the in-vehicle equipment 20a. When a time slot area is determined, this area is notified to the in-vehicle equipment 20a to 20d by a broadcast signal (3001). After that, the in-vehicle equipment 20a performs the vehicle-vehicle communication by the time slot allocated by the roadside equipment 10 (4001).

As shown in FIG. 2, if the roadside equipment 10 does not receive the signal showing that the own vehicle exists in the road-vehicle area, the roadside equipment 10 releases the radio resource from the in-vehicle equipment 20 allocated the radio resource. Specifically, when the in-vehicle equipment 20a provides service-out of the road-vehicle area (1002), the in-vehicle equipment 20a may not receive the health check signal regularly transmitted from the roadside equipment 10. This makes it impossible for the in-vehicle equipment 20a to provide feedback of the health check response signal to the roadside equipment 10 (2002). When receiving no health check response signal from the in-vehicle equipment 20a, the roadside equipment 10 immediately performs time slot release processing (3002).

As described above, in the radio resource allocation release system 1, the radio resource is allocated to the in-vehicle equipment that provides service-in in the road-vehicle area, and radio resource allocation release is performed for the in-vehicle equipment that provides service-out of the road-vehicle area. As a result, the radio resource allocation release system 1 may prevent the radio resource from being depleted and perform the communication in the area.

Figure 3:
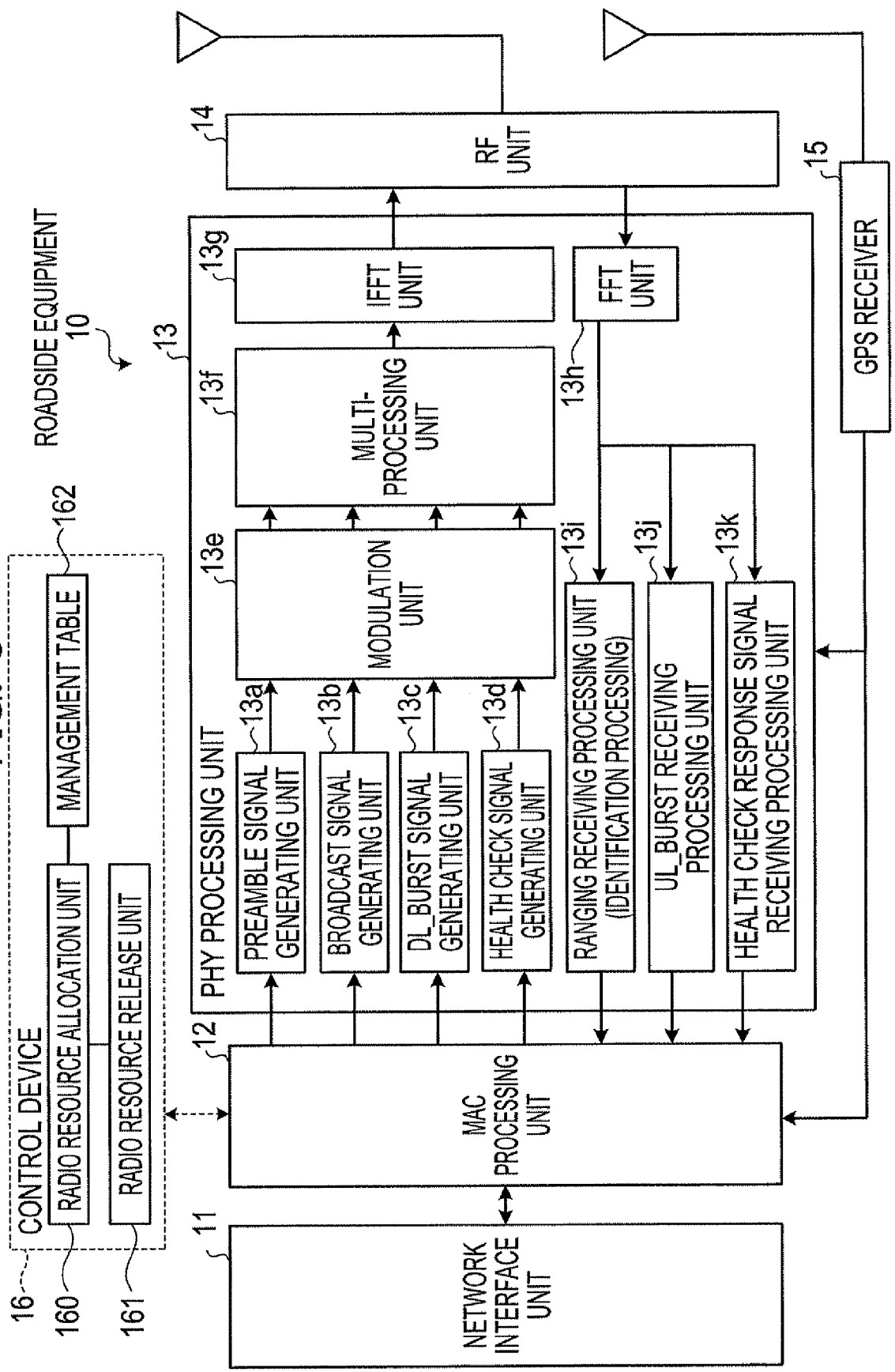
FIG. 3 illustrates a configuration of a roadside equipment 10.

By using FIG. 3, description will be made of a configuration of the roadside equipment 10 shown in FIG. 10. FIG. 3 is a block diagram showing the configuration of the roadside equipment 10. As shown in FIG. 3, the roadside equipment 10 includes a network interface unit 11, a MAC processing unit 12, a PHY processing unit 13, an RF unit 14, a GPS receiver 15, and a control device 16. Processing of each unit will be described below. The communication system is applicable to either a TDMA format or an OFDM (A) format. The present embodiment describes the case of applying the OFDM (A).

The network interface unit 11 has an interface for inputting data of the network to the roadside equipment 10 and for transmitting the data to the MAC processing unit 12. The MAC processing unit 12 includes a MAC layer for encoding the transmission data and correcting errors and the like. The RF unit 14 may perform radio frequency conversion of a baseband signal or convert radio frequency into a baseband, and then regularly transmits, to each in-vehicle equipment, the health check signal for checking the communication state of the in-vehicle equipment. The GPS receiver 15 generates a standard time and an internal timing signal for performing synchronization between the roadside equipment 10 and the in-vehicle equipment 20.

The PHY processing unit 13 may act as a transmitter/receiver. As a transmitter, the PHY processing unit includes a Preamble signal generating unit 13a that generates a Preamble signal, a Broadcast signal generating unit 13b that generates a Broadcast signal, a DL_Burst signal generating unit 13c that generates a down Burst signal on which transmission data may be loaded, a health check signal generating unit 13d that generates a health check signal and a vehicle ID, a Modulation unit 13e that performs modulation format processing instructed by the MAC processing unit 12, a multiprocessing unit 13f that performs multiprocessing on each signal, and an IFFT unit 13g.

As a receiver, the PHY processing unit 13 includes an FFT unit 13h that performs FFT processing on a signal at a baseband level, a Ranging receiving processing unit 13i that detects a Ranging signal from the received signals, a UL_Burst signal receiving processing unit 13j that performs receiving processing on a UL_Burst signal of the area that is UL_MAP specified by the MAC processing unit, and a health check response signal receiving processing unit 13k that performs the receiving processing on the health check response signal.

The control device 16 includes a radio resource allocation unit 160, a radio resource release unit 161, and a management table 162. The radio resource allocation unit 160 corresponds to the "radio resource allocation unit" described in the range of the patent claim. The radio resource release unit 161 corresponds to the "radio resource release unit" described in the range of the patent claim.

The management table 162 stores a table for managing a timestamp as the allocated radio resource. The management table 162, as shown in FIG. 4, stores the following in association with each other: "vehicle ID" for uniquely identifying the vehicle such as number plate information, a vehicle-specific number, and an IP address of the in-vehicle equipment, "road-vehicle area-in/out" showing whether or not the vehicle provides service-in in the road-vehicle area, and "allocation TS" showing the allocated timestamp.

When receiving the health check response signal from the in-vehicle equipment 20, the radio resource allocation unit 160 allocates the radio resource to the in-vehicle equipment 20. Specifically, when receiving the health check response signal from the in-vehicle equipment 20, the radio resource allocation unit 160 performs the allocation processing of the time slot for the vehicle-vehicle communication for the in-vehicle equipment 20, and then notifies each in-vehicle equipment of this area by the broadcast signal when the time slot area is determined.

When the radio resource release unit 161 does not receive the signal indicating that the own vehicle exists in the road-vehicle area from the in-vehicle equipment allocated the radio resource, the radio resource release unit 161 releases the radio resource. Specifically, when receiving no health check response signal from the in-vehicle equipment 20, the radio resource release unit 161 immediately performs the time slot release processing.

Figure 5:
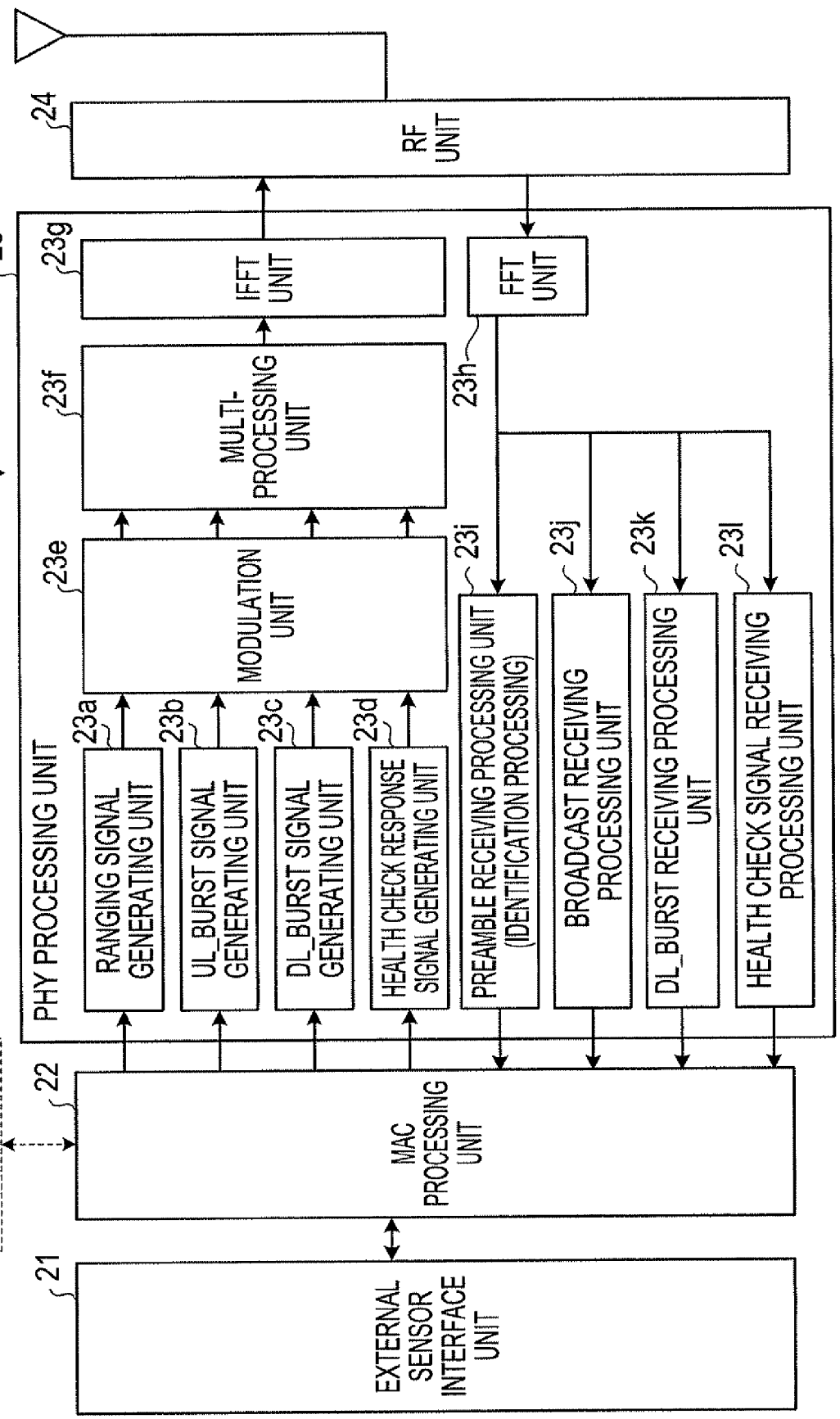
FIG. 5 illustrates a configuration of an in-vehicle equipment 20.

Next, by using FIG. 5, description will be made of a configuration of the in-vehicle equipment 20 shown in FIG. 1. FIG. 5 is a block diagram showing the configuration of the in-vehicle equipment 20. As shown in FIG. 5, the in-vehicle equipment 20 includes an external sensor interface unit 21, a MAC processing unit 22, a PHY processing unit 23, an RF unit 24, a control device 25. Processing of each unit will be described below.

In the case of a vehicle, the external sensor interface unit 21 has a function for receiving speed information and vehicle information from an in-vehicle equipment external unit to notify the MAC processing unit 22 of the information and a function for notifying the in-vehicle equipment external unit of the information notified by the MAC from the roadside equipment 10. The MAC processing unit 22 has the MAC layer function for encoding the transmission data and for correcting errors and the like. The RF unit 24 has a transmission/reception function for performing radio frequency conversion on the baseband signal, or for converting the radio frequency into the baseband. The RF unit transmits the response signal, as a signal showing that the own vehicle exists in the given area, to respond to the health check signal from the roadside equipment 10. The control device 25 has a function for performing each processing based on the received information.

The PHY processing unit 23 includes a transmission function and a reception function. As a transmitter, the PHY processing unit includes a Ranging signal generating unit 23a, a UL_Burst signal generating unit 23b that generates an up Burst signal for the vehicle-vehicle communication a DL_Burst signal generating unit 23c that generates a down Burst signal for the vehicle-vehicle communication, a health check response signal generating unit 23d that generates a health check signal, a Modulation unit 23e that performs the modulation format processing instructed by the MAC processing unit 22, a multiprocessing unit 23f that performs the multiprocessing on each signal, and an IFFT unit 23g.

As a receiver, the PHY processing unit 23 includes an FFT unit 23h that performs the FFT processing on the signal at the baseband level, a Preamble receiving processing unit 23i that detects a Preamble signal from the received signals a DL_Burst receiving processing unit 23k that performs the receiving processing on the DL_Burst signal in the area DL_MAP specified by the MAC processing unit 22, and a health check signal receiving processing unit 23l that performs the receiving processing on the health check signal.

Figure 6:
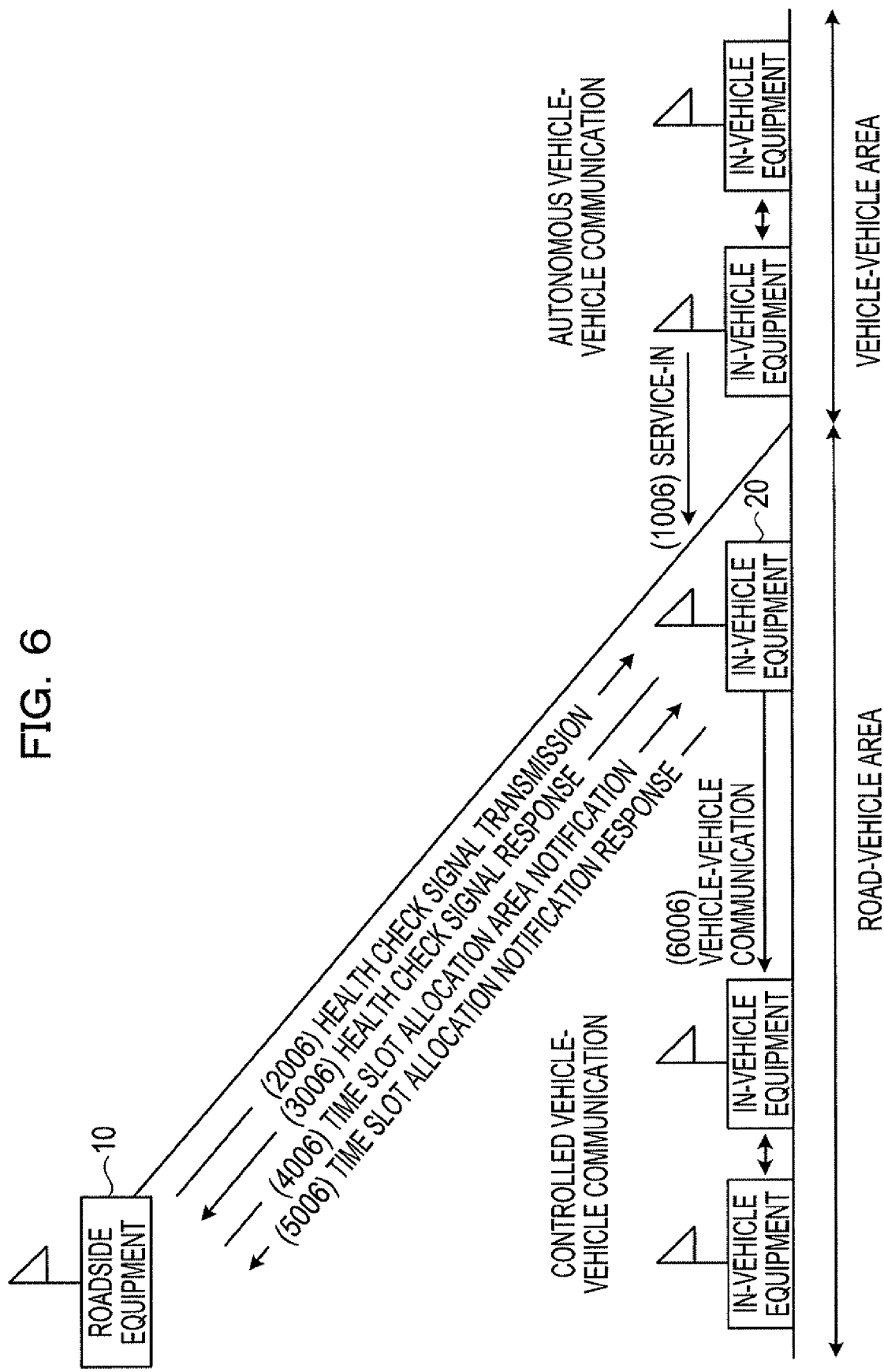
FIG. 6 illustrates a time slot allocation processing of a radio resource allocation release system.
Figure 7:
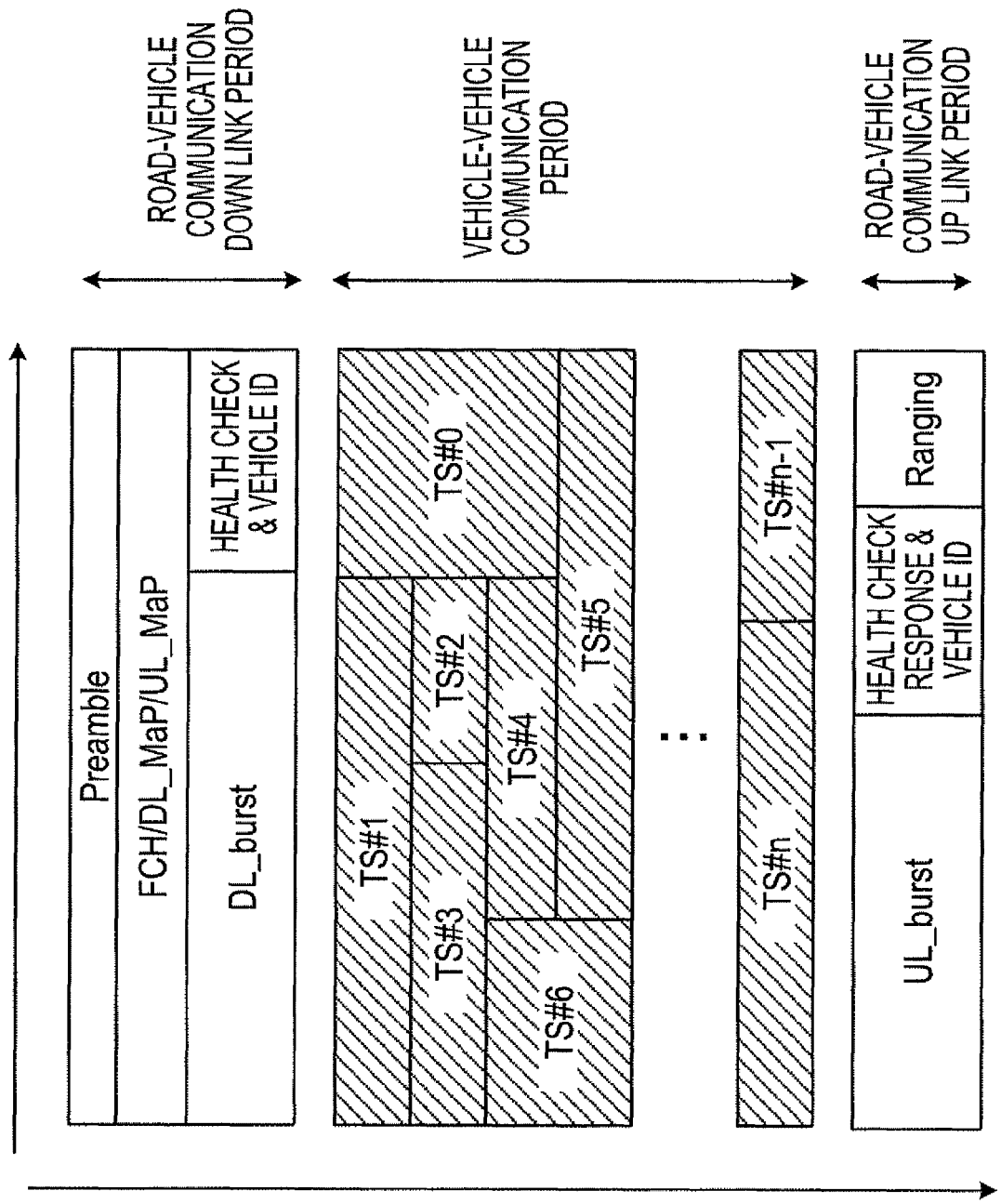
FIG. 7 illustrates an exemplary frame configuration.
Figure 8:
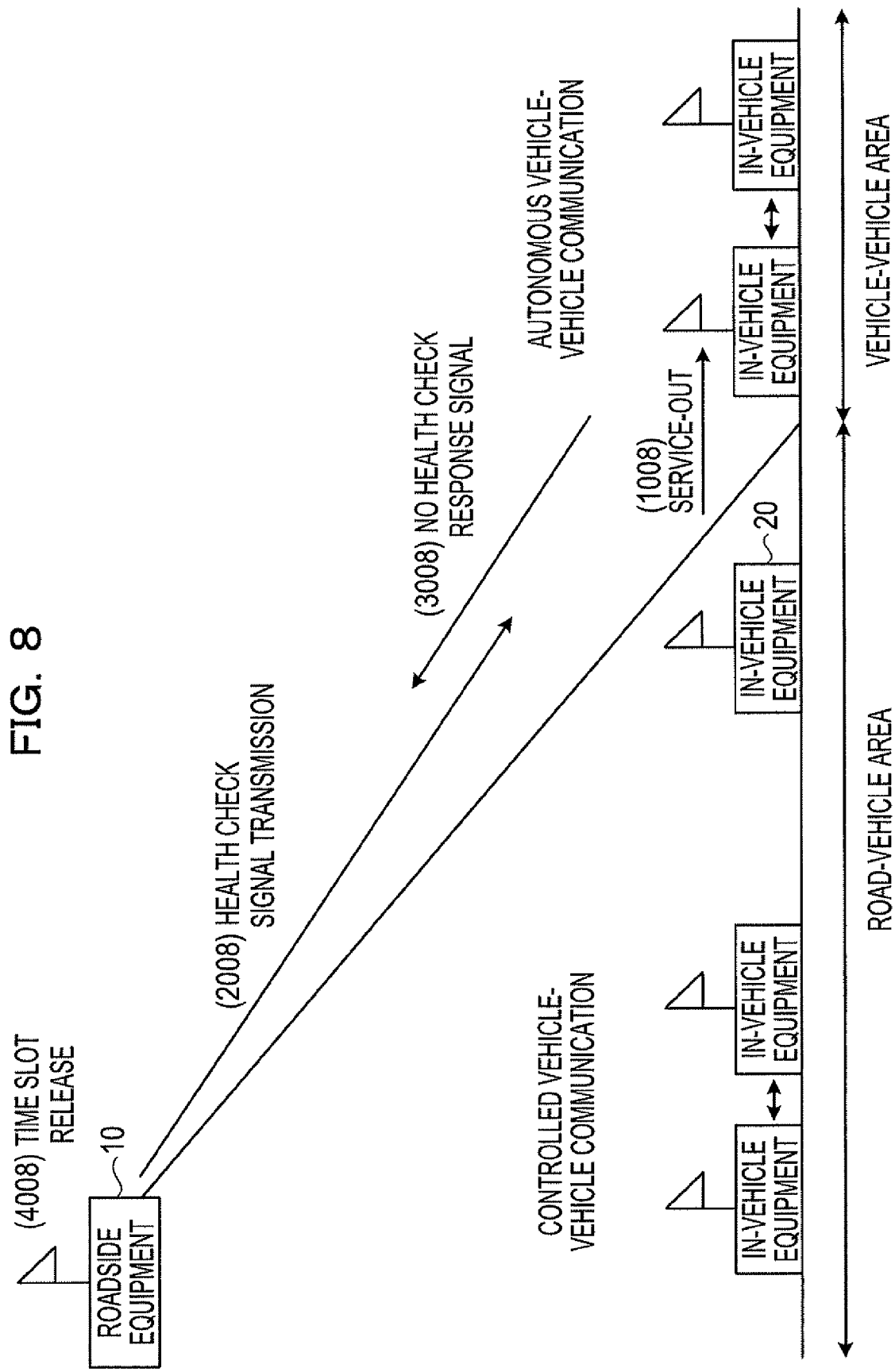
FIG. 8 illustrates a time slot release processing of the radio resource allocation release system.

By using FIG. 6 to FIG. 8, description will be made of time slot allocation processing and time slot release processing of the radio resource allocation release system 1. FIG. 6 is a diagram describing the time slot allocation processing of the radio resource allocation release system. FIG. 7 is a diagram describing an example of the frame configuration. FIG. 8 is a diagram describing the time slot release processing of the radio resource allocation release system.

The time slot allocation processing of the radio resource allocation release system is described. As shown in FIG. 6, after the in-vehicle equipment 20 enters the road-vehicle area and provides service-in (1006), the roadside equipment 10 transmits, to the in-vehicle equipment 20, the health check signal for checking the communication state, regularly transmitted (2006). Then the in-vehicle equipment 20 recognizes that the in-vehicle equipment 20 enters the road-vehicle area as a service area, and then transmits the health check response signal to the roadside equipment 10 (3006).

When receiving the health check response signal from the in-vehicle equipment 20, the roadside equipment 10 performs the allocation processing of the time slot for the vehicle-vehicle communication for the in-vehicle equipment 20. When the time slot area is determined, the roadside equipment 10 gives a time slot allocation area notification to each in-vehicle equipment 20 by the broadcast signal (4006). This notification includes the vehicle ID for specifying the vehicle as well as the health check signal in the frame configuration, so that each in-vehicle equipment 20 determines whether or not the notification is given to the own vehicle.

The in-vehicle equipment 20 transmits, to the roadside equipment 10, a response indicating that the in-vehicle equipment 20 receives the time slot allocation notification (5006). The in-vehicle equipment 20 performs the vehicle-vehicle communication by using the time slot allocated by the roadside equipment 10 (6006).

By using FIG. 7, description will be made of the frame configuration. As shown in FIG. 7, the frame configuration time-divides a frame period for performing the road-vehicle communication and a frame period for performing the vehicle-vehicle communication. An OFDMA (Orthogonal Frequency-Division Multiple Access) system is used as a modulation system, and an operating frequency band is divided as well as the time to each data by a sub carrier. The frame includes a Preamble, a Broadcast signal including an FCH, downlink allocation information (DL_MAP) and uplink allocation information (UL_MAP), a health check signal, a vehicle ID regularly transmitted from the roadside equipment, a plurality of down Bursts and up Bursts on which transmission data may be loaded, and a plurality of time slots.

Next, by using FIG. 8, description will be made of the time slot release processing of the radio resource allocation release system. As shown in FIG. 8, when the in-vehicle equipment 20 provides service-out of the road-vehicle area (1008), the in-vehicle equipment 20 may not receive the health check that is regularly transmitted from the roadside equipment 10 (2008), so that the roadside equipment 10 may not provide feedback of the health check response signal to the roadside equipment 10 (3008). When receiving no health check response signal from the in-vehicle equipment 20, the roadside equipment 10 immediately performs the time slot release processing (4008).

Figure 9:
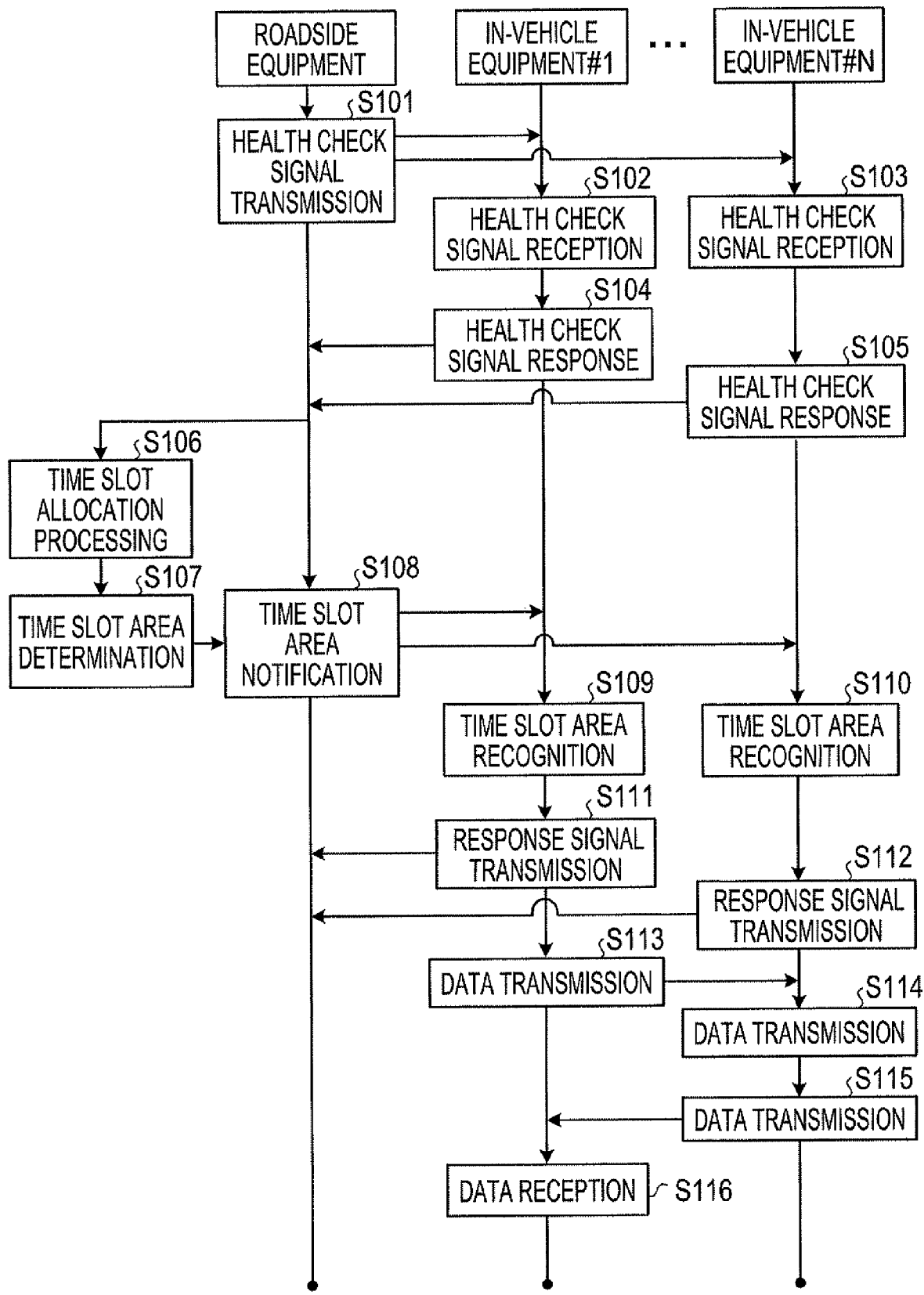
FIG. 9 illustrates a radio resource allocation release system.
Figure 10:
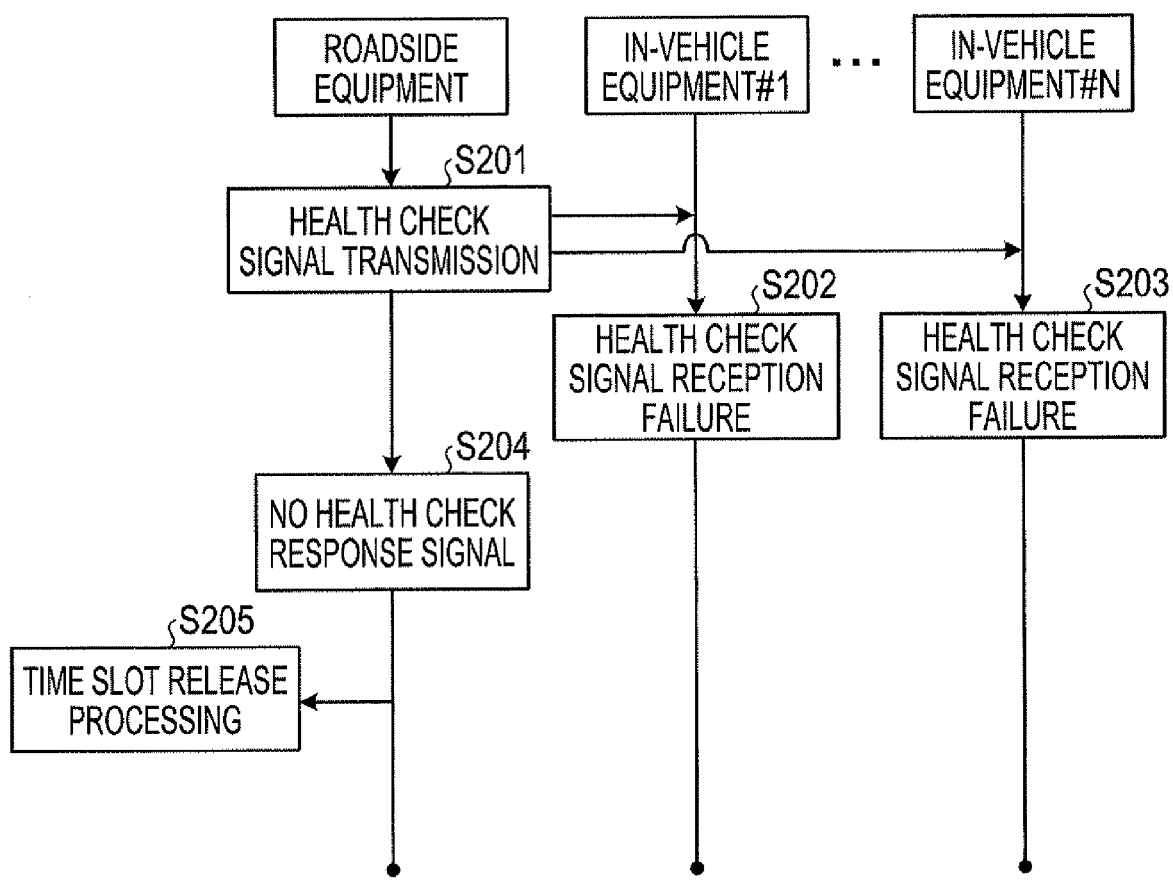
FIG. 10 is a sequence diagram showing a flow of the time slot release processing by the radio resource allocation release system.

FIG. 9 and FIG. 10 illustrate processing by the radio resource allocation release system 1. FIG. 9 illustrates time slot allocation processing by the radio resource allocation system. FIG. 10 illustrates time slot release processing by the radio resource allocation release system.

A time slot allocation processing by the radio resource allocation system is shown in FIG. 9, as the roadside equipment 10 transmits, to the in-vehicle equipment 20, the health check signal regularly transmitted for checking the communication state (operation S101). The in-vehicle equipment 20 receives the health check signal (operation S102 and operation S103) and recognizes that the in-vehicle equipment 20 enters the road-vehicle area as a service area, and then transmits the health check response signal to the roadside equipment 10 (operation S104 and operation S105).

When receiving the health check response signal from the in-vehicle equipment 20, the roadside equipment 10 performs the allocation processing of the time slot for the vehicle-vehicle communication for the in-vehicle equipment 20 (operation S106). When the time slot area is determined (operation S107), the roadside equipment 10 notifies each in-vehicle equipment 20 of the time slot allocation area notification for notifying this area by the broadcast signal (operation S108).

The in-vehicle equipment 20 recognizes the time slot area (operation S109 and operation S110), and then transmits, to the roadside equipment 10, the response indicating that the in-vehicle equipment 20 receives the time slot allocation notification (operation S111 and operation S112). Then each of the in-vehicle equipment 20 performs the vehicle-vehicle communication with each other by using the time slot allocated by the roadside equipment 10 (operation S113 to operation S116).

A time slot release processing by the radio resource allocation release system is illustrated in FIG. 10, and the roadside equipment 10 transmits, to the in-vehicle equipment 20, the health check signal regularly transmitted for checking the communication state (operation S201). If the in-vehicle equipment 20 provides service-out of the road-vehicle area, the in-vehicle equipment 20 may not receive the health check signal regularly transmitted from the roadside equipment 10 (operation S202 and operation S203). Thus, the in-vehicle equipment 20 may not provide feedback of the health check response signal to the roadside equipment 10. When receiving no health check response signal from the in-vehicle equipment 20a (operation S204), the roadside equipment 10 immediately performs the time slot release processing (operation S205).

As described above, the radio resource allocation release system 1 allocates the radio resource to the in-vehicle equipment 20 that provides service-in in the road-vehicle area, and then performs the radio resource allocation release to the in-vehicle equipment 20 that provides service-out of the road-vehicle area. Thus, the in-vehicle equipment 20 prevents the radio resource from being depleted, and then performs the radio resource allocation for the in-vehicle equipment 20 that provides service-in in the road-vehicle area. This makes it possible to perform the communication in the area.

The above described exemplary embodiment described the case when it is determined whether or not the in-vehicle equipment exists in the road-vehicle area by using the health check signal. However, the embodiments of the present invention are not so and it is possible to determine whether the in-vehicle equipment exists in the road-vehicle area by using location information for specifying the location of the in-vehicle equipment.

An exemplary embodiment determines whether or not the in-vehicle equipment exists in the road-vehicle area by using the location information that is obtained from a GPS by the in-vehicle equipment in order to allocate and release the radio resource. By using FIG. 11 to FIG. 17, description will be made of a configuration and processing of a radio resource allocation release system 1a according to an exemplary embodiment.

Figure 11:
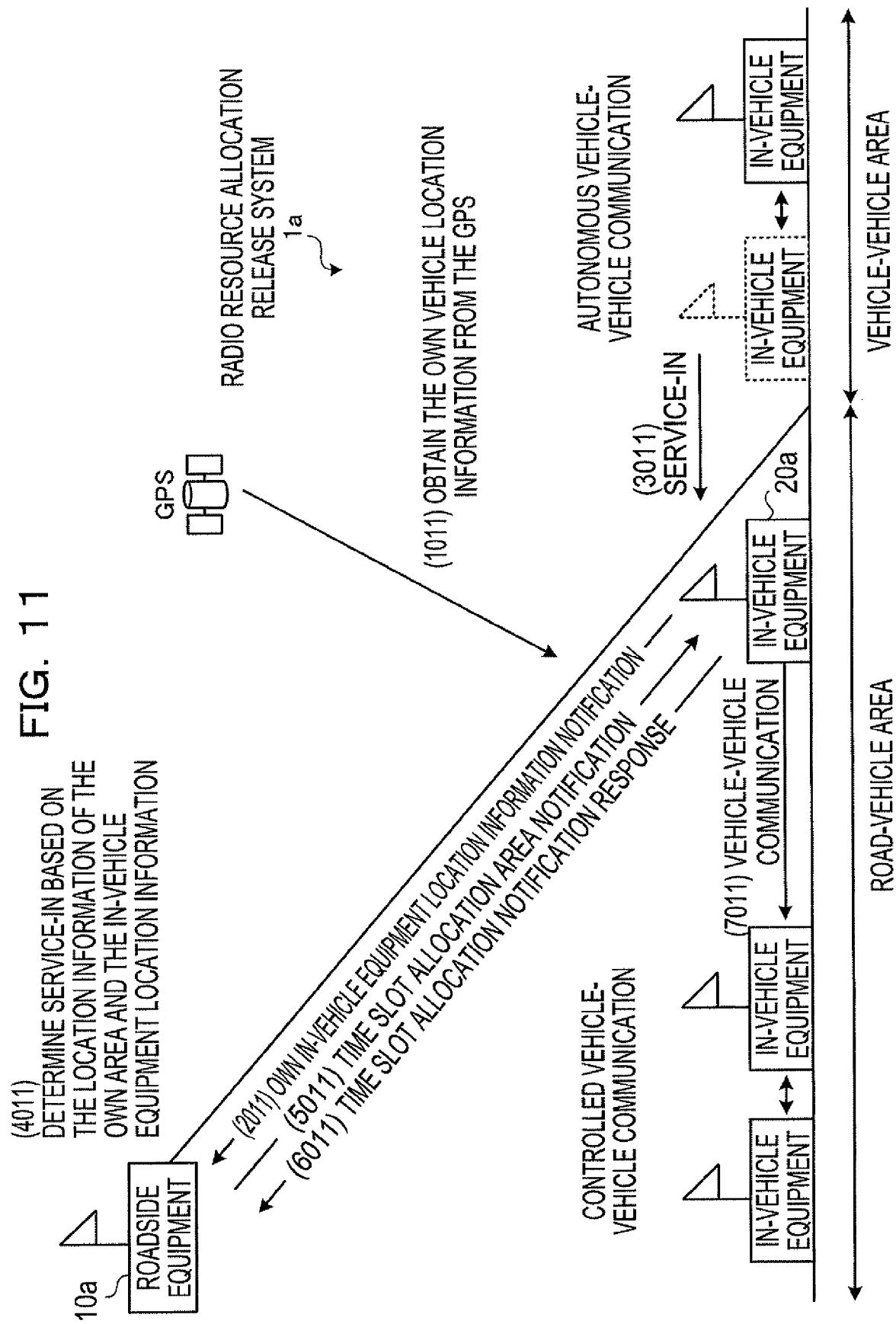
FIG. 11 illustrates a radio resource allocation release system 1a according to an exemplary embodiment.
Figure 12:
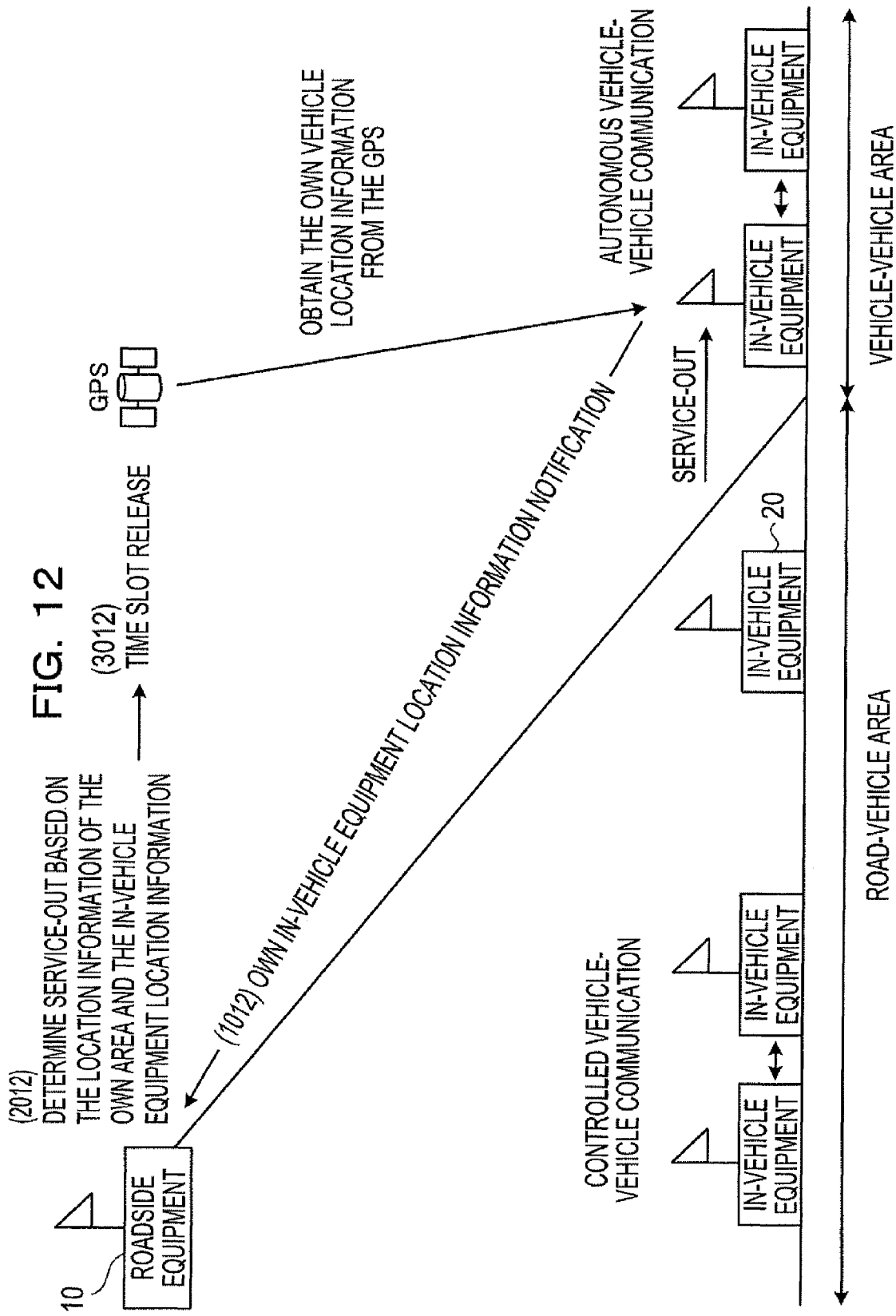
FIG. 12 illustrates a radio resource allocation release system 1a according to an exemplary embodiment.
Figure 13:
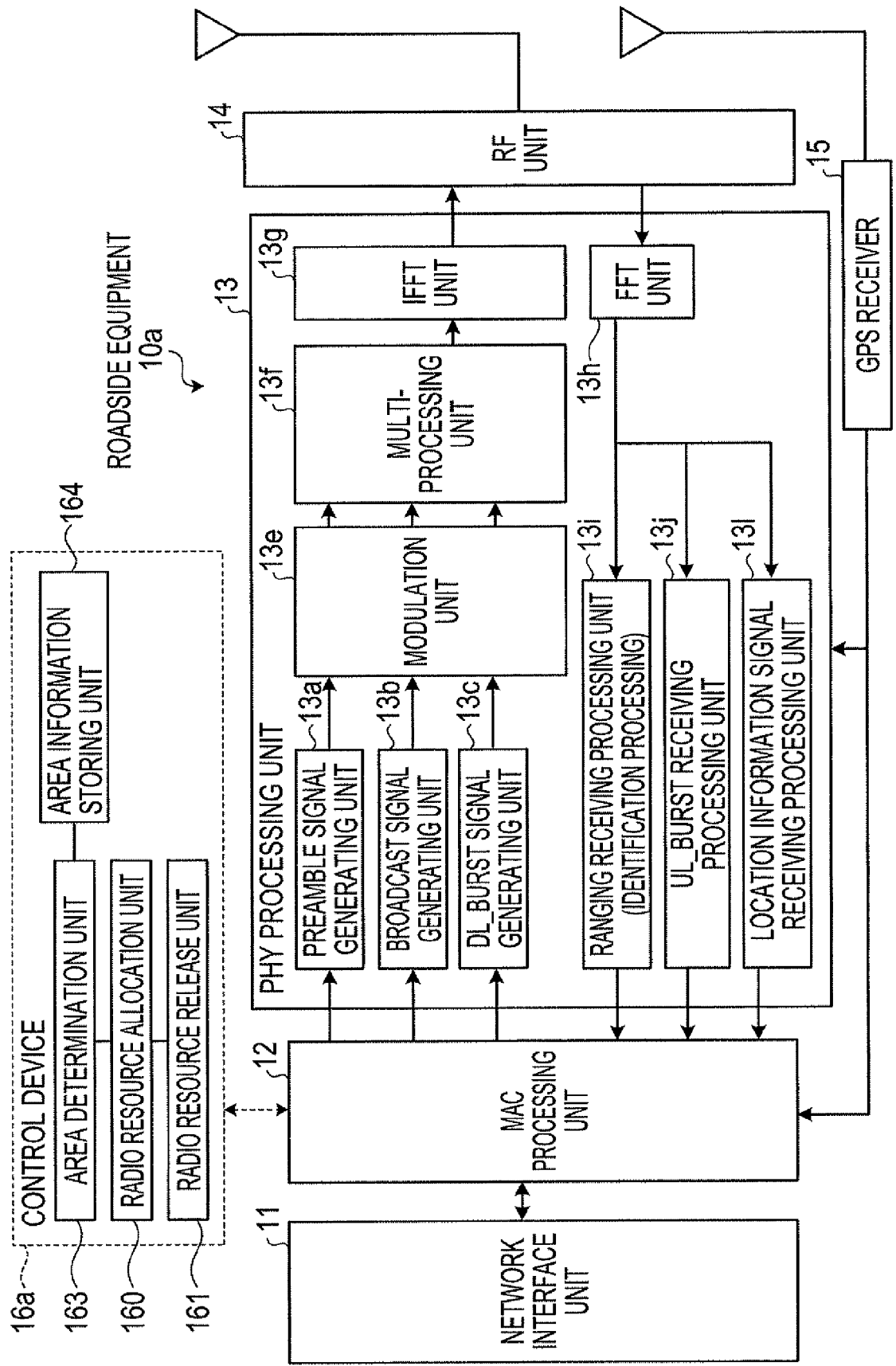
FIG. 13 illustrates a configuration of the roadside equipment 10 according to an exemplary embodiment.
Figure 14:
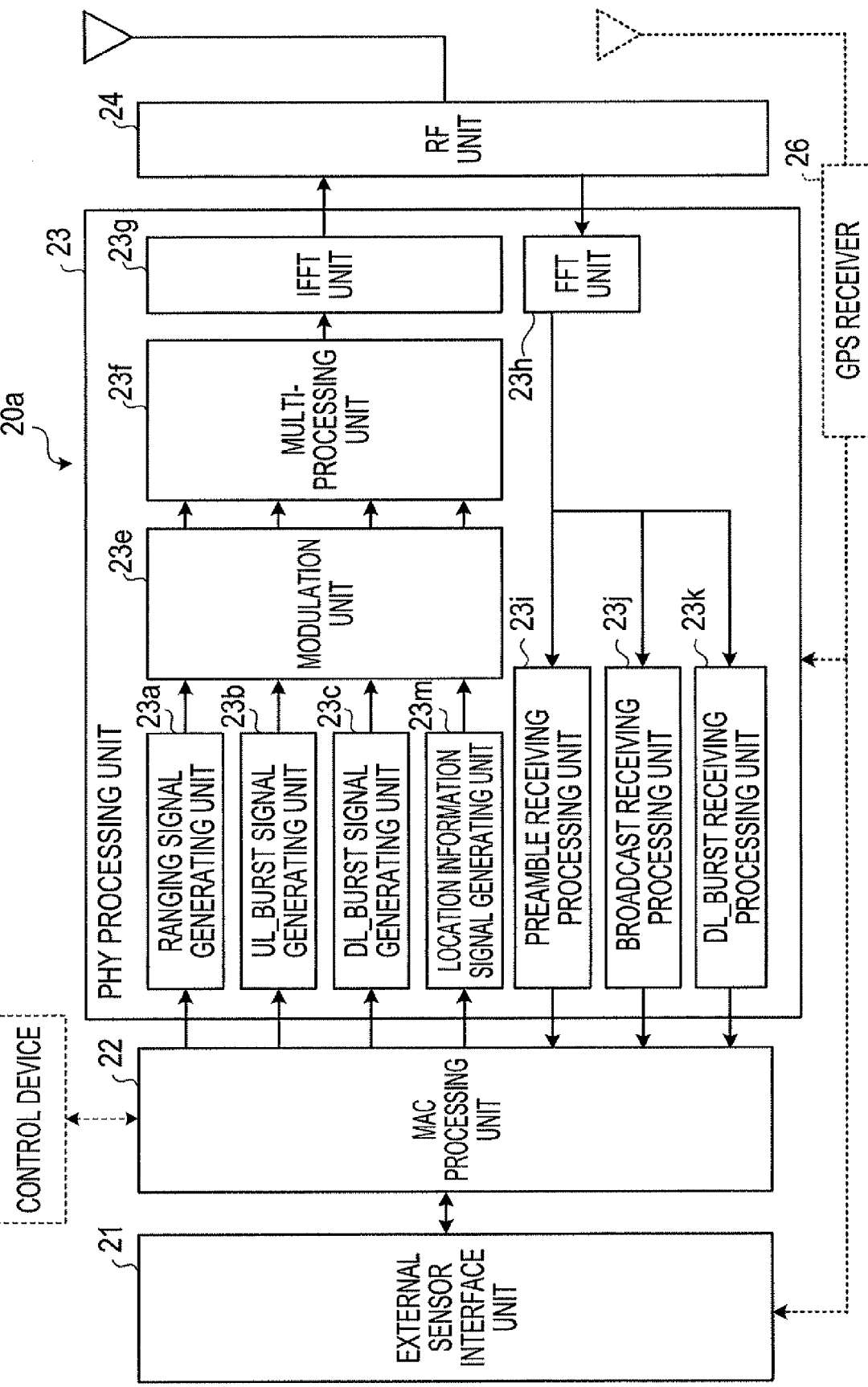
FIG. 14 illustrates a configuration of the in-vehicle equipment 20 according to an exemplary embodiment.
Figure 16:
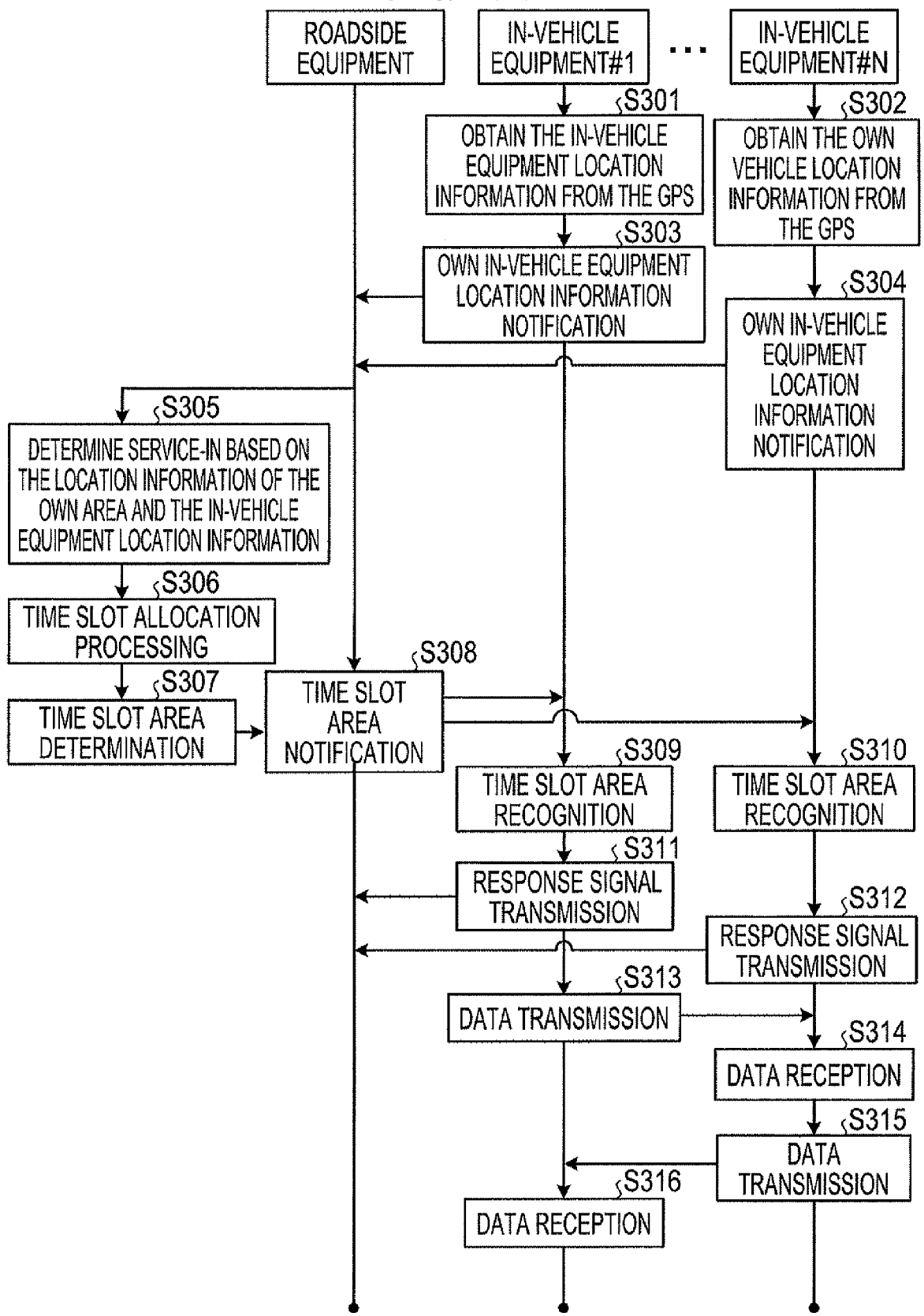
FIG. 16 illustrates a time slot allocation processing by the radio resource allocation release system according to an exemplary embodiment.
Figure 17:
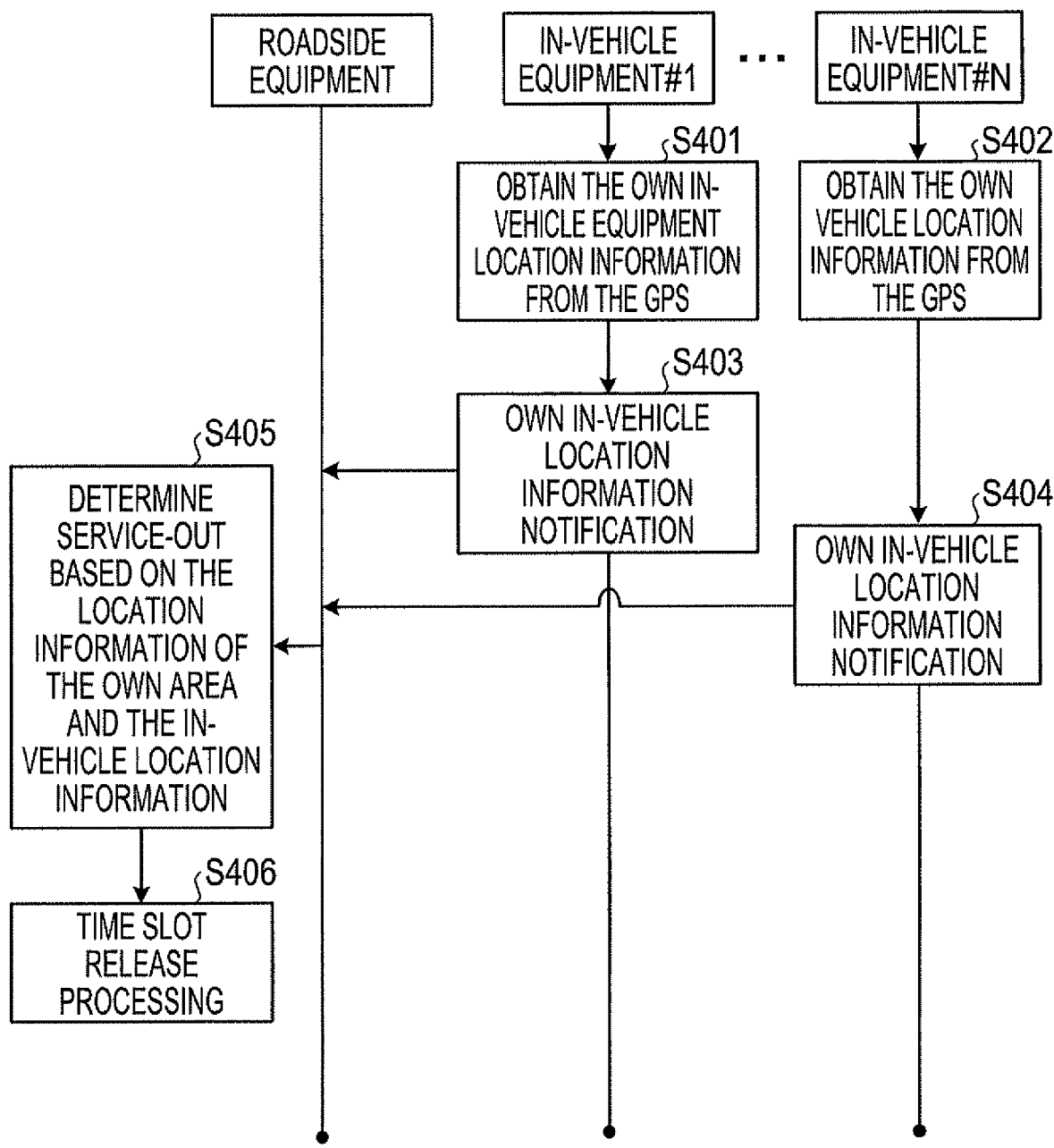
FIG. 17 illustrates a time slot release processing by the radio allocation release system according to an exemplary embodiment.

FIG. 11 and FIG. 12 illustrate radio resource allocation release system 1a according to an exemplary embodiment. FIG. 13 illustrates a configuration of the roadside equipment 10 according to an exemplary embodiment. FIG. 14 illustrates an example of the frame configuration. FIG. 16 illustrates time slot allocation processing according to an exemplary embodiment. FIG. 17 illustrates a flow of the time slot release processing by the radio resource allocation release system according to an exemplary embodiment.

As shown in FIG. 11, the in-vehicle equipment 20a of the radio resource allocation release system 1a receives the location information from the GPS, and then transmits the location information received from the GPS to the roadside equipment 10a (1011) to (2011).

The roadside equipment 10a determines, based on the location information transmitted from the in-vehicle 20a, whether or not the in-vehicle equipment 20a exists in the road-vehicle area. The roadside equipment 10a allocates the radio resource to the in-vehicle equipment 20a when it is determined that the in-vehicle equipment 20a exists in the road-vehicle area. Specifically, when the in-vehicle equipment 20a enters the road-vehicle area from the vehicle-vehicle area (3011), the roadside equipment 10a determines service-in based on the location information of the road-vehicle area that is set in advance and the location information received from the in-vehicle equipment (4011). The roadside equipment 10a performs the allocation processing of the time slot for the vehicle-vehicle communication for the vehicle (5011).

When the time slot area is determined, the roadside equipment 10a notifies the in-vehicle equipment 20a of this area by the broadcast signal (6011). Then the in-vehicle equipment 20a performs the vehicle-vehicle communication by the time slot allocated by the roadside equipment 10a.

As shown in FIG. 12, the roadside equipment 10a releases the radio resource when it is determined that the in-vehicle equipment 20a allocated the radio resource does not exist in the road-vehicle area. The location information is notified from the in-vehicle equipment (1012), the roadside equipment 10a determines service-out based on the location information of the own area that is set in advance and the location information received from the in-vehicle equipment (2012), and then immediately performs the time slot release processing (3012).

In the radio resource allocation release system 1a according to an exemplary embodiment, it is possible to recognize a service area end based on the GPS location information and to release the time slot to the vehicle that provides service-out. Thus, it is possible to prevent the time slot from being depleted and to perform radio resource allocation for the in-vehicle that provides service-in in the road-vehicle area. This makes it possible to perform the communication in the area.

FIG. 13 illustrates a configuration of the roadside equipment 10a according to a second exemplary embodiment. Compared with the roadside equipment 10 shown in FIG. 3, there is a difference in that the roadside equipment 10a according to an exemplary embodiment newly includes a location information signal receiving processing unit 131, an area determination unit 163, and a road-vehicle area information storing unit 164. In the roadside equipment 10a, the location information signal receiving processing unit 131 receives the location information transmitted from the in-vehicle equipment 20a.

A control device 16a includes a radio resource allocation unit 160, a radio resource release unit 161, an area determination unit 163, and a road-vehicle area information storing unit 164.

The road-vehicle area information storing unit 164 stores location information related to a range of the road-vehicle area. The road-vehicle area information storing unit 164 compares the location information with the location information received from the in-vehicle equipment 20a by the area determination unit 163 described later, and then stores the location information of the road-vehicle area used to determine whether or not the in-vehicle equipment exists in the road-vehicle area. For example, the road-vehicle area information storing unit 164 stores the range specified by latitude or longitude as the location information of the road-vehicle area.

The area determination unit 163 determines, based on the location information transmitted from the in-vehicle equipment 20a, whether or not the in-vehicle equipment 20a exists in the road-vehicle area. The area determination unit 163 determines whether or not the in-vehicle equipment 20a exists in the road-vehicle area by comparing the location information of the road-vehicle stored in the road-vehicle area information storing unit 164 with the location information received by the in-vehicle equipment. If the area determination unit 163 determines that the in-vehicle equipment 20a exists in the road-vehicle area, the area determination unit 163 transmits, to the radio resource allocation unit 160, the notification indicating that the time slot is allocated to the in-vehicle equipment 20a. If the area determination unit 163 determines that the in-vehicle equipment 20a does not exist in the road-vehicle area, the area determination unit 163 transmits, to the radio resource release unit 161, the notification indicating that the time slot of the in-vehicle equipment 20a is released.

If the area determination unit 163 determines that the in-vehicle equipment 20a exists in the road-vehicle area, the radio resource allocation unit 160 allocates the radio resource to the in-vehicle equipment 20a. Upon receiving the notification indicating that the time slot is allocated to the in-vehicle equipment 20a from the area determination unit 163, the radio resource allocation unit 160 allocates the radio resource to the in-vehicle equipment 20a.

When it is determined that the in-vehicle equipment 20a allocated the radio resource does not exist in the road vehicle area, the radio resource release unit 161 releases the radio resource. Upon receiving the notification indicating that the time slot of the in-vehicle equipment 20a is released from the area determination unit 163, the radio resource release unit 161 releases the radio resource.

FIG. 14 illustrates a configuration of the in-vehicle equipment 20a according to a second exemplary embodiment. Compared with the in-vehicle equipment 20 shown in FIG. 5, there is a difference in that the in-vehicle equipment 20a according to a second exemplary embodiment newly includes a location information signal generating unit 23m and a GPS receiver 26.

In the in-vehicle equipment 20a, the location information signal generating unit 23m generates a location information signal based on the location information received by the GPS receiver 26, and then transmits the location information signal to the road-vehicle equipment 10a through the RF unit 24. The GPS receiver 26 receives the location information from the GPS.

Figure 15:
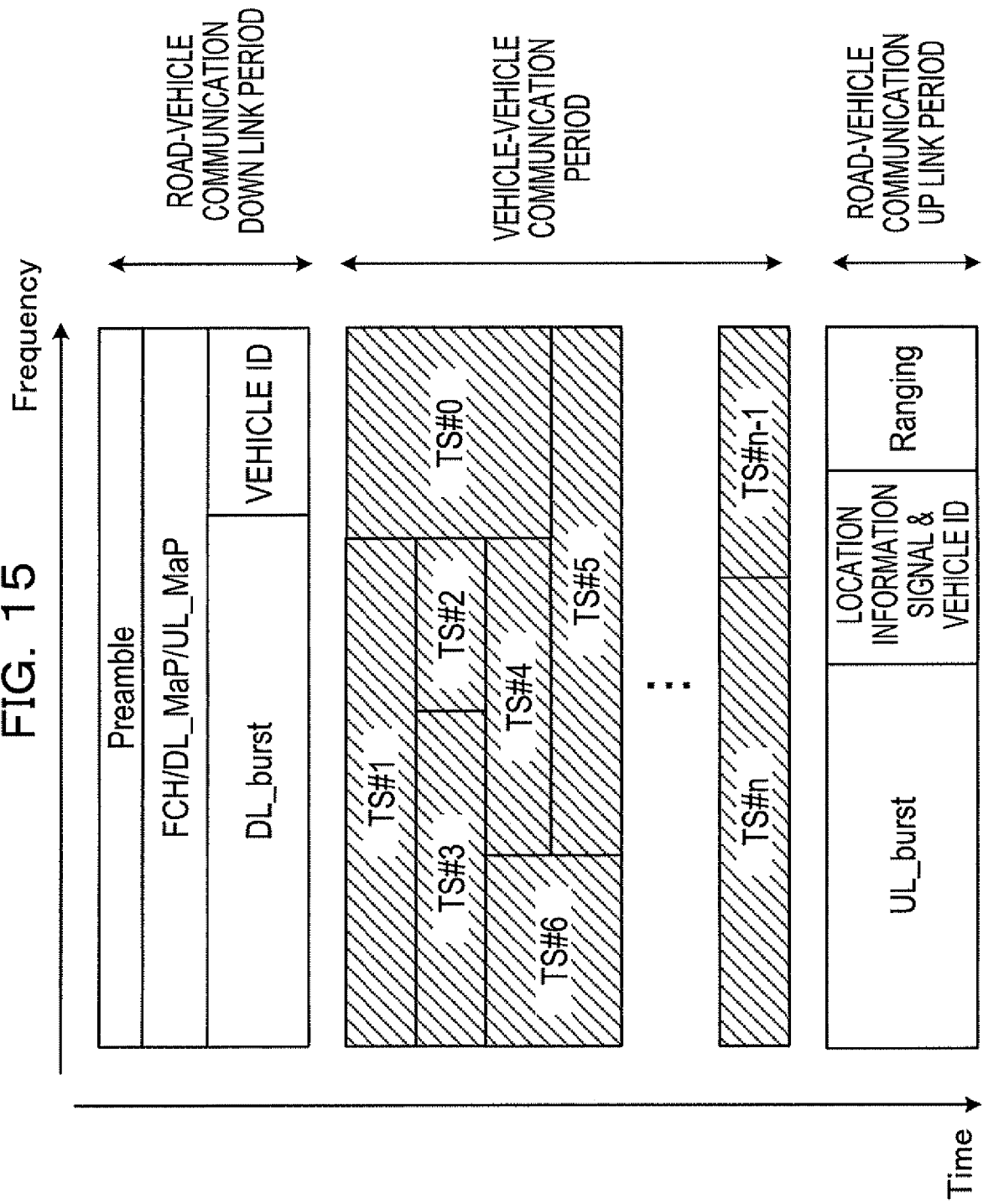
FIG. 15 illustrates an exemplary frame configuration.

By using FIG. 15, description will be made of an example of the frame configuration. Compared with the frame configuration disclosed for the first exemplary embodiment, in the frame configuration used for a second exemplary embodiment, the health check signal area of a road-vehicle communication down period has only "vehicle ID," and the health check response signal area of a road-vehicle communication up period is replaced with "location information signal & vehicle ID area."

FIG. 16 and FIG. 17 illustrate processing by the radio resource allocation release system 1a according to an exemplary embodiment. FIG. 16 illustrates time slot allocation processing by the radio resource allocation release system according to an exemplary embodiment. FIG. 17 illustrates time slot release processing by the radio resource allocation release system according to an exemplary embodiment.

The flow of the time slot allocation processing by the radio resource allocation release system is described. As shown in FIG. 16, the in-vehicle equipment 20a of the radio resource allocation release system 1a receives the location information from the GPS (operation S301 and operation S302), and then transmits the location information received from the GPS to the roadside equipment 10a (operation S303 and operation S304).

When the in-vehicle equipment 20a enters the road-vehicle area from the vehicle-vehicle area, the roadside equipment 10a determines service-in based on the location information of the road-vehicle area that is set in advance and the location information received from the in-vehicle equipment (operation S305). The roadside equipment 10a performs the allocation processing of the time slot for the vehicle-vehicle communication for the vehicle (operation S306). When the time slot area is determined (operation S307), the roadside equipment 10a notifies each in-vehicle equipment 20a of the time slot allocation area notification for notifying this area by the broadcast signal (operation S308).

As with the previously disclosed t embodiment, the in-vehicle equipment 20a recognizes the time slot area (operation S309 and operation S310), and then transmits the response indicating that the time slot allocation notification is received to the road-vehicle equipment 10a (operation S311 to S312). Each of the in-vehicle equipment 20a performs the vehicle-vehicle communication with each other by using the time slot allocated by the roadside equipment 10a (operation S313 to operation S316).

The flow of the time slot release processing by the radio resource allocation release system is described. As shown in FIG. 17, the in-vehicle equipment 20a of the radio resource allocation release system 1a receives the location information from the GPS (operation S401 and operation S402), and then transmits the location information received from the GPS to the roadside equipment 10a (operation S403 and operation S404). When the location information is notified from the in-vehicle equipment 20a, the roadside equipment 10a determines service-out based on the location information of the own area that is set in advance and the location information received from the in-vehicle equipment (operation S405), and then immediately performs the time slot release processing (operation S406).

In an exemplary embodiment described above, it is possible to accurately recognize the service area end based on the GPS location information and to allocate the time slot to the vehicle that provides service-in. An exemplary embodiment described above is an effective method for defining the road-vehicle service area by the location information (latitude and longitude) regardless of radio wave conditions.

In an exemplary embodiment described above, it is possible to accurately recognize the service area end based on the GPS location information and to release the time slot to the vehicle that provides service-out. Thus, it is possible to prevent the time slot from being depleted.

The above described exemplary embodiment described a case when it is determined whether the in-vehicle equipment exists in the road-vehicle area. However, the embodiments are not limited to this case. The in-vehicle equipment may detect passage of a service area end detection facility that is located at a road-vehicle area end to determine whether or not the in-vehicle equipment exists in the road-vehicle area.

In an exemplary embodiment, the in-vehicle equipment detects the passage of the service area end detection facility that is located at the road-vehicle area end to determine whether or not the in-vehicle equipment exists in the road-vehicle area, and then allocates and releases the radio resource. By using FIG. 18 to FIG. 23, description will be made of a configuration and processing of a radio resource allocation release system 1b according to an exemplary embodiment.

Figure 18:
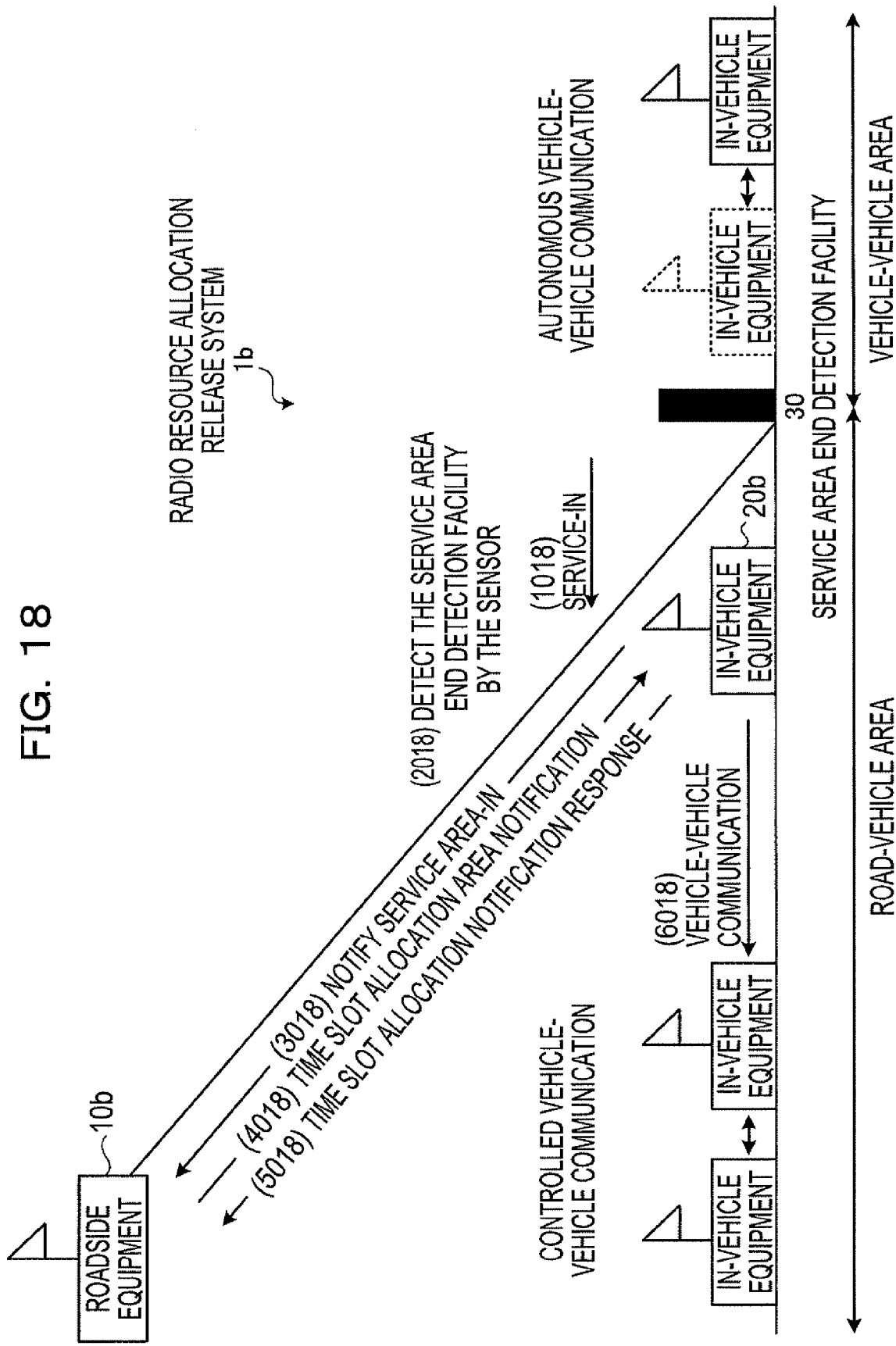
FIG. 18 illustrates a radio resource allocation release system 1b according to an exemplary embodiment.
Figure 19:
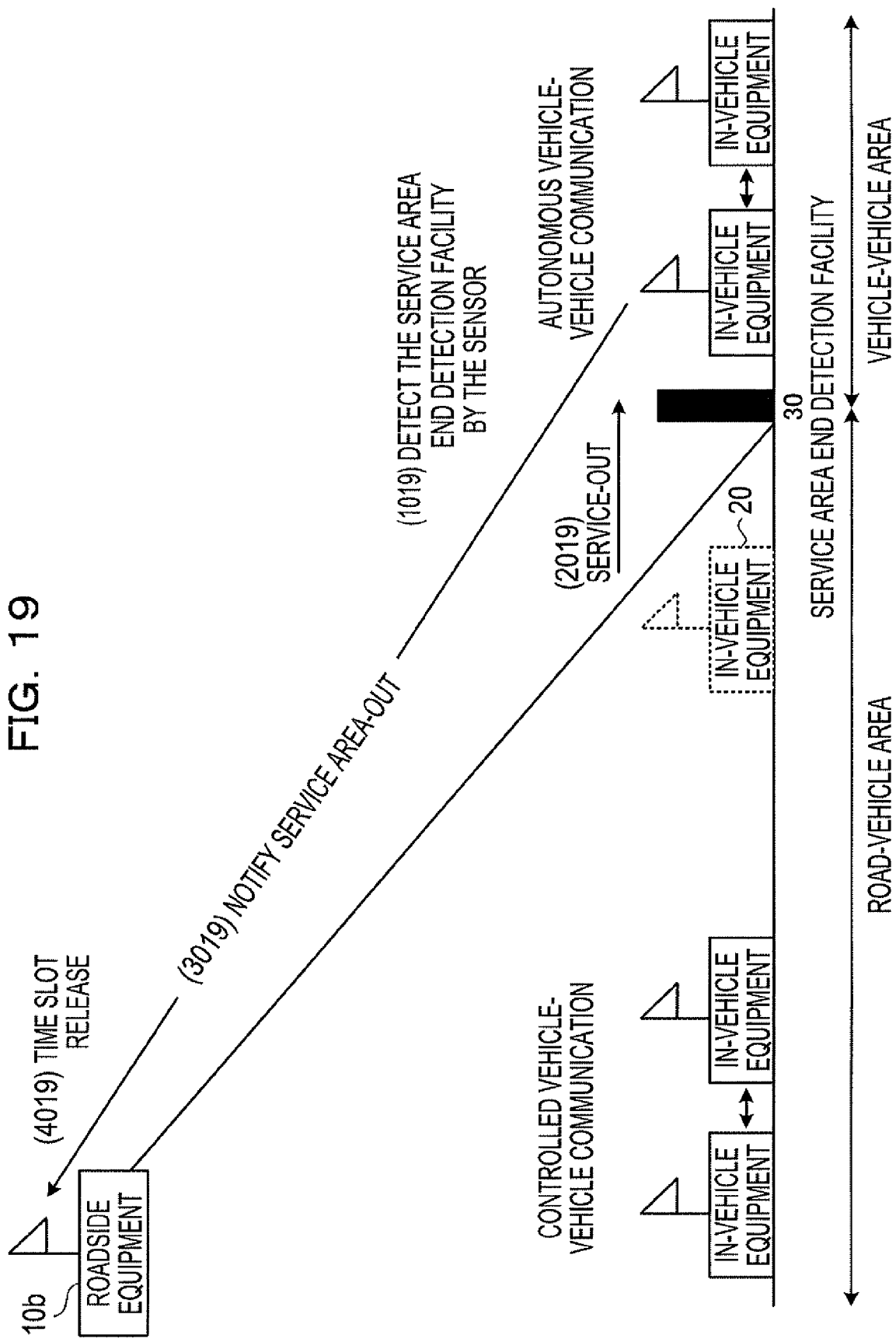
FIG. 19 illustrates a radio resource allocation release system 1b according to an exemplary embodiment.
Figure 20:
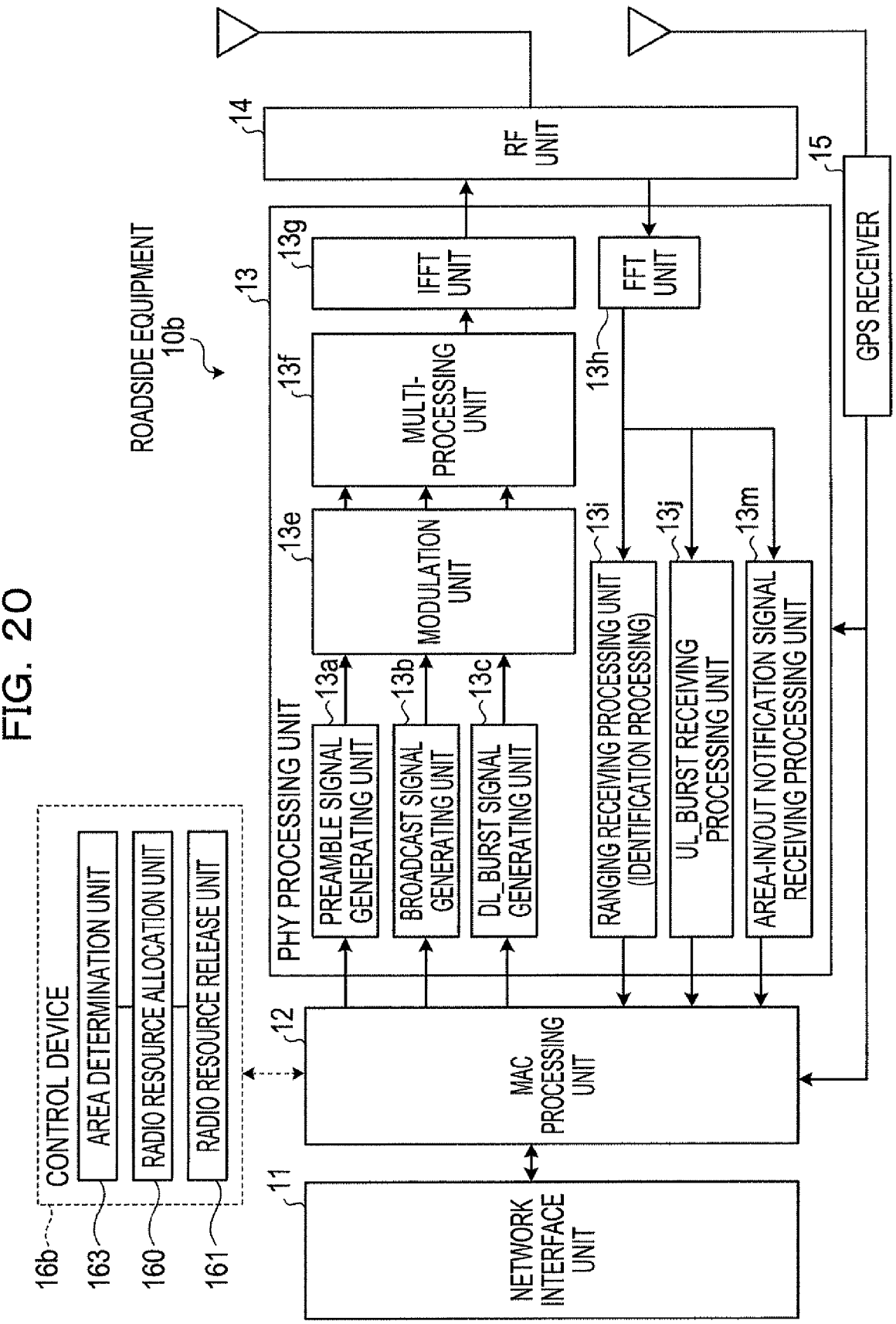
FIG. 20 illustrates a configuration of a roadside equipment 10b according to an exemplary embodiment.
Figure 21:
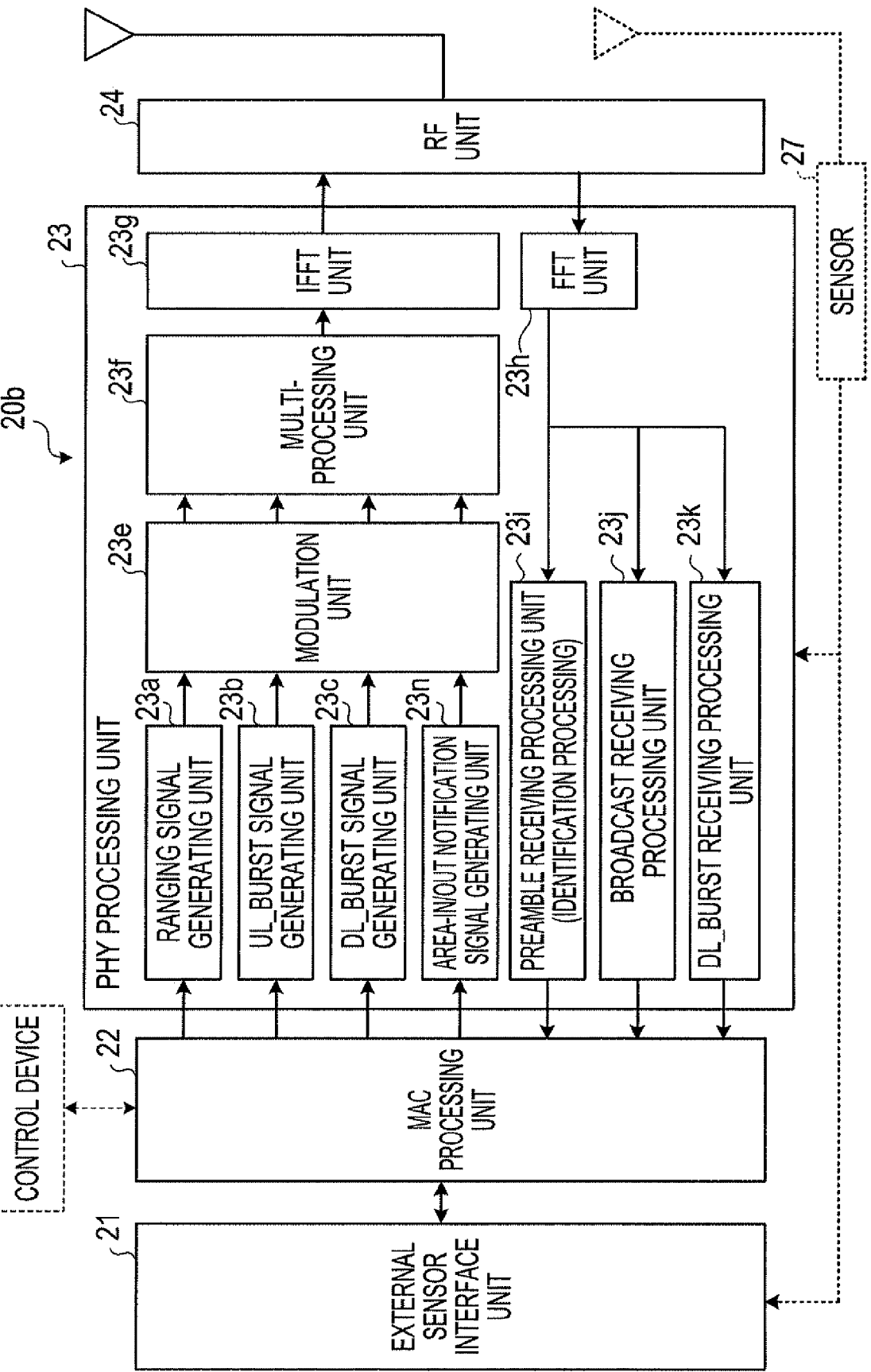
FIG. 21 illustrates a configuration of an in-vehicle equipment 20b according to an exemplary embodiment.
Figure 22:
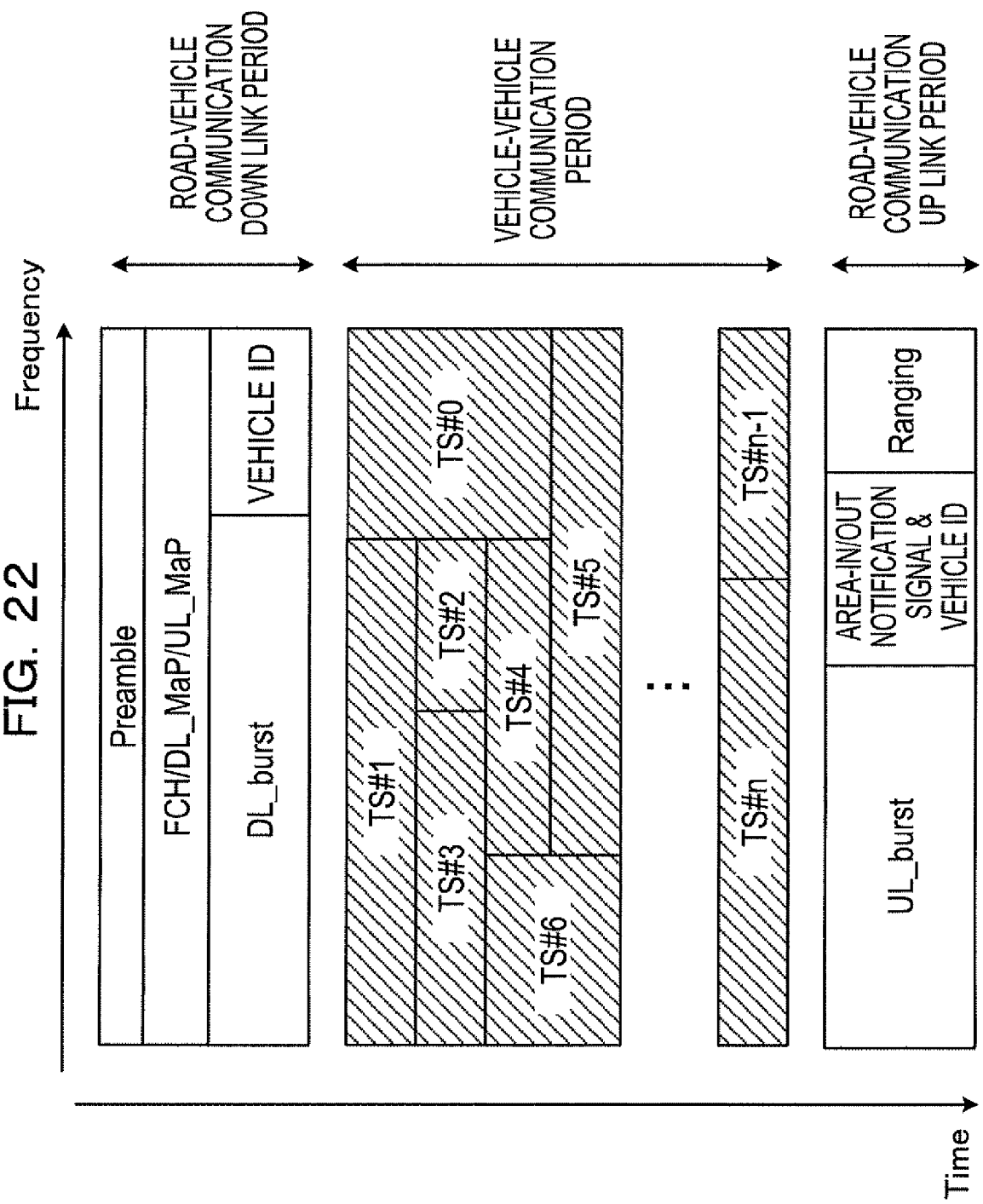
FIG. 22 illustrates an exemplary frame configuration.
Figure 23:
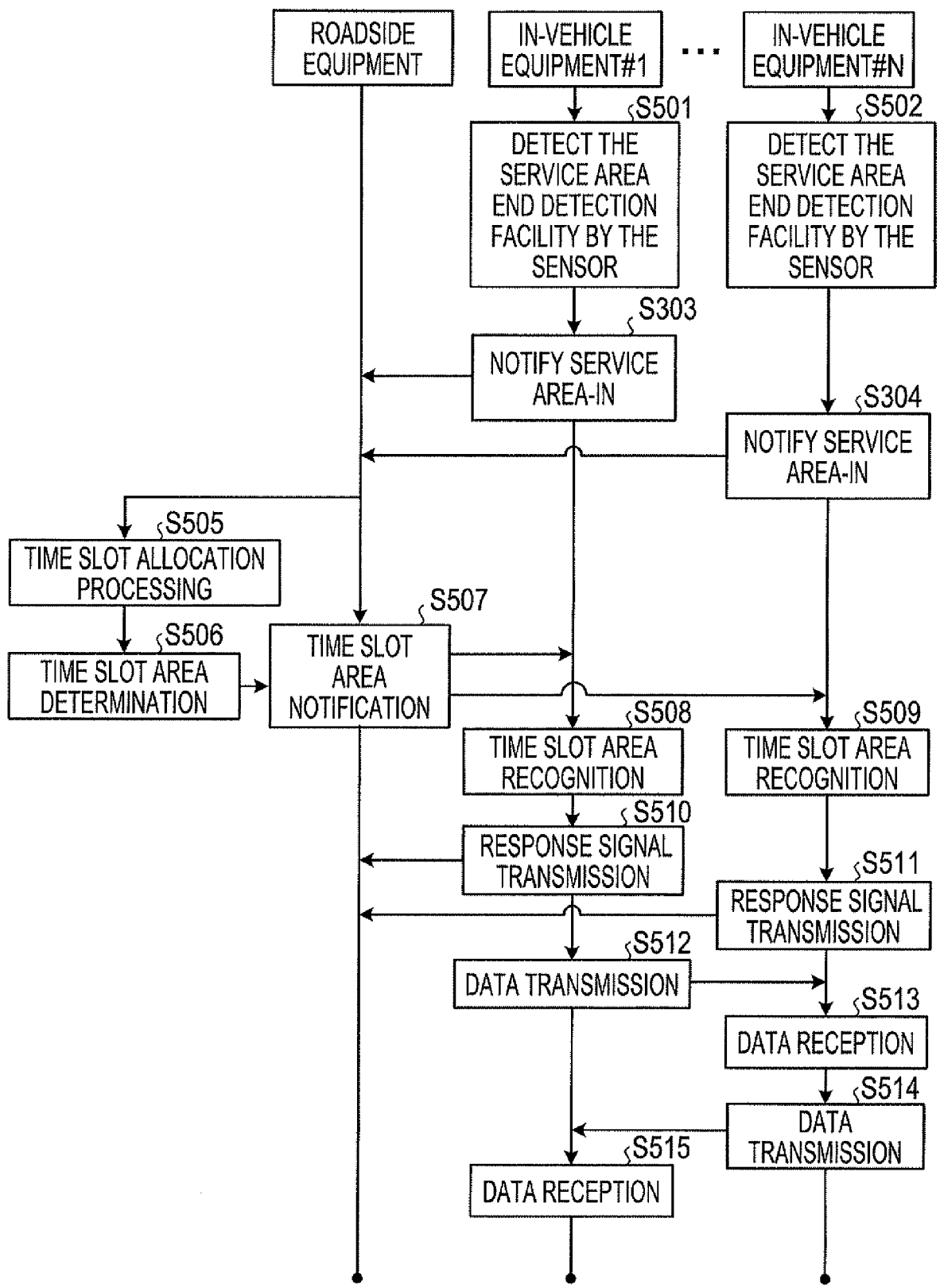
FIG. 23 illustrates a time slot allocation processing by the radio resource allocation system according to an exemplary embodiment.
Figure 24:
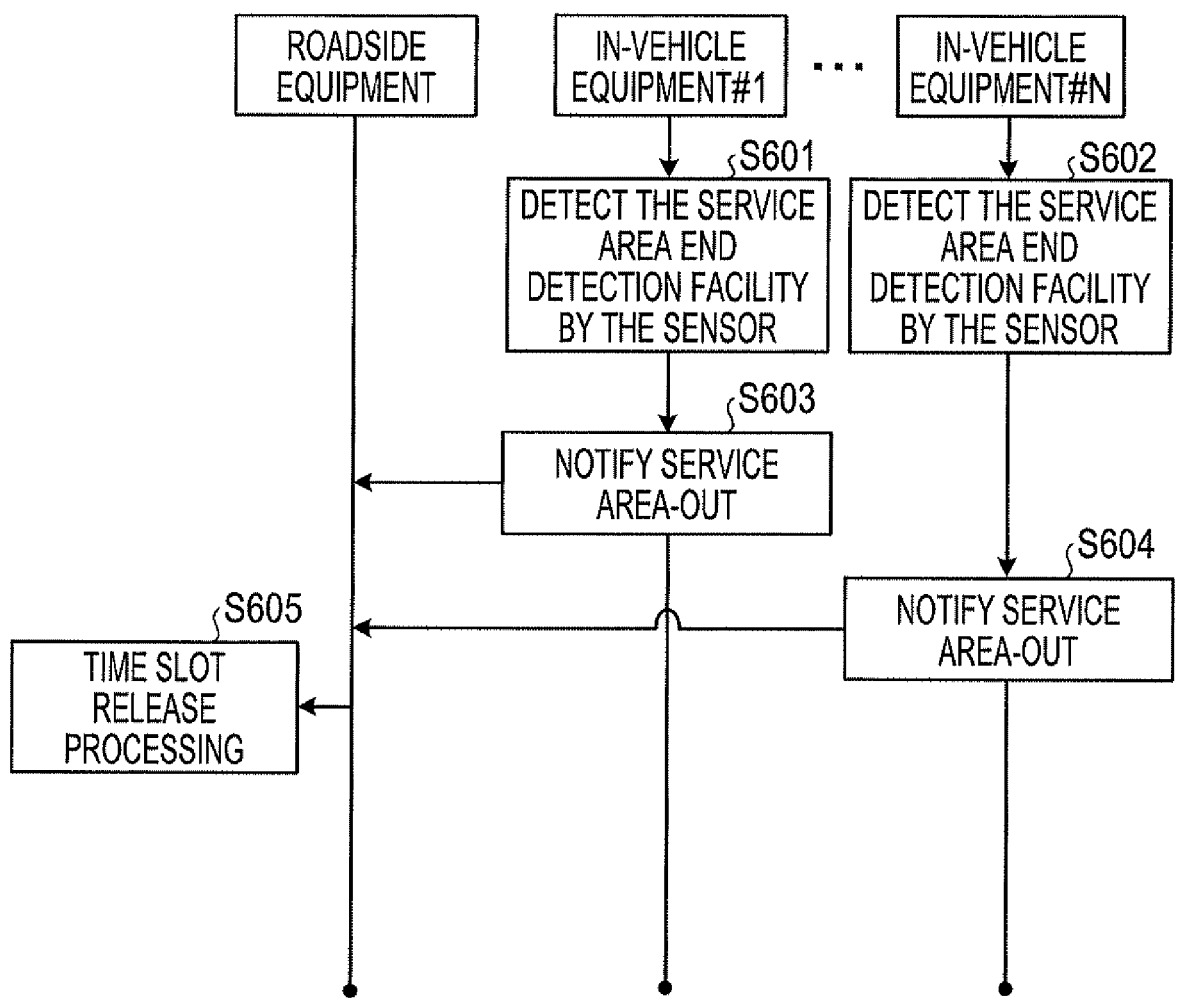
FIG. 24 illustrates a time slot release processing by the radio resource allocation release system according to an exemplary embodiment.

FIG. 18 and FIG. 19 illustrate a radio resource allocation release system 1b. FIG. 20 is a block diagram showing a configuration of the roadside equipment 10b according to an exemplary embodiment. FIG. 21 illustrates a configuration of an in-vehicle equipment 20b according to an exemplary embodiment. FIG. 22 illustrates an example of the frame configuration. FIG. 23 illustrates time slot allocation processing by the radio resource allocation release system according to an exemplary embodiment. FIG. 24 illustrates time slot release processing by the radio resource allocation release system according to an exemplary embodiment.

As shown in FIG. 18, the in-vehicle equipment 20b of the radio resource allocation release system 1b detects the passage of a service area end detection facility 30 that is located at the road-vehicle area end, and then notifies the roadside equipment 10b of the passage information related to the detected passage of the service area end detection facility 30.

If the road-vehicle service area end detection facility 30 is placed on a road, when the own vehicle enters the road-vehicle area from the vehicle-vehicle area (1018), the in-vehicle equipment 20b detects the facility by a sensor, and then recognizes service-in (2018). Here, identification for service-in or service-out is determined by a direction in which the in-vehicle equipment passes through this facility. The in-vehicle equipment 20b transmits a service area-in notification signal to the roadside equipment (3018).

The roadside equipment 10b determines, based on the transmitted passage information, whether or not the in-vehicle equipment 20b exists in the road-vehicle area. If it is determined that the in-vehicle equipment 20b exists in the road-vehicle area, the roadside equipment 10b allocates the radio resource to the in-vehicle equipment 20b. Specifically, when receiving the service area-in notification signal, the roadside equipment 10b performs the allocation processing of the time slot for the vehicle-vehicle communication for the vehicle. When the time slot area is determined, the roadside equipment 10b notifies the in-vehicle equipment of this area by the broadcast signal (4018).

The in-vehicle equipment 20b transmits, to the roadside equipment 10b, the response indicating that the time slot allocation notification is received (5018), and then performs the vehicle-vehicle communication by the time slot allocated by the roadside equipment 10b (6018).

As shown in FIG. 19, if it is determined that the in-vehicle equipment 20b allocated the radio resource does not exist in the given area, the roadside equipment 10b releases the radio resource. Upon passing through the road-vehicle service area end detection facility 30, the in-vehicle equipment 20b detects this facility by the sensor (1019), and then recognizes service-out (2019). The in-vehicle equipment 20b transmits a service area-out notification signal to the roadside equipment 10b (3019). When receiving the service area-out notification signal, the roadside equipment 10b immediately performs the time slot release processing (4019).

In the radio resource allocation release system 1b according to an exemplary embodiment, the in-vehicle equipment sensor detects the road-vehicle service area end detection facility 30, and then the in-vehicle equipment 20b notifies this to the roadside equipment 10b. This makes it possible to accurately recognize the service area end and to release the time slot to the vehicle that provides service-out. Therefore, by preventing the time slot from being depleted and performing the radio resource allocation for the in-vehicle equipment that provides service-in in the road-vehicle area, it is possible to perform the communication in the area.

FIG. 20 illustrates a configuration of the roadside equipment 10b according to an exemplary embodiment. Compared with the roadside equipment 10 shown in FIG. 3 the roadside equipment 10b includes an area-in/out notification signal receiving processing unit 13m and an area determination unit 163. In the roadside equipment 10b, the area-in/out notification signal receiving processing unit 13m receives the service area in notification signal transmitted from the in-vehicle equipment 20b or the service area-out notification signal transmitted from the in-vehicle equipment 20b.

The control device 16a includes a radio resource allocation unit 160, a radio resource release unit 161, and an area determination unit 163.

The area determination unit 163 determines, based on the transmitted passage information, whether or not the in-vehicle equipment 20b exists in the road-vehicle area. Upon receiving the service area-in notification signal from the in-vehicle equipment 20b, the roadside equipment 10b determines that the in-vehicle equipment 20b exists in the road-vehicle area. The area determination unit 163 transmits, to the radio resource allocation unit 160, the notification indicating that the time slot is allocated to the in-vehicle equipment 20a. When receiving the service area-out notification signal from the in-vehicle equipment 20b, the area determination unit 163 determines that the in-vehicle equipment 20b does not exist in the road-vehicle area, and then transmits, to the radio resource release unit 161, the notification indicating that the time slot of the in-vehicle equipment 20b is released.

If it is determined that the in-vehicle equipment 20b does not exist in the road-vehicle area, the radio resource allocation unit 160 allocates the radio resource to the in-vehicle equipment 20b. Upon receiving the notification indicating that the time slot is allocated to the in-vehicle equipment 20b from the area determination unit 163, the radio resource allocation unit 160 allocates the radio resource to the in-vehicle equipment 20b.

If it is determined that the in-vehicle equipment 20b allocated the radio resource does not exist in the road-vehicle area, the radio resource release unit 161 releases the radio resource. Upon receiving the notification indicating that the time slot of the in-vehicle equipment 20b is released from the area determination unit 163, the radio resource release unit 161 releases the radio resource.

FIG. 21 illustrates in-vehicle equipment 20b according to an exemplary embodiment. Compared with the in-vehicle equipment 20 shown in FIG. 5, the in-vehicle equipment 20b according to this exemplary embodiment includes an area in/out notification signal generating unit 23n and a sensor 27.

In the in-vehicle equipment 20b, the area-in/out notification signal generating unit 23n generates a service area-in notification signal or a service area-out notification signal depending on a result detected by the sensor 27, and transmits these signals to the roadside equipment 10a through the RF unit 24.

The sensor 27 detects the passage of the service area end detection facility 30 placed at the road-vehicle area end. Identification for service-in or service-out is determined by the direction in which the in-vehicle equipment passes through the service area end detection facility 30.

FIG. 22 illustrates an exemplary frame configuration. The frame configuration used for this exemplary embodiment has a configuration in which the location information signal area of the road-vehicle communication up period is replaced with "area-in/out notification signal & vehicle ID area".

FIG. 23 and FIG. 24 illustrate processing by the radio resource allocation release system 1b according to an exemplary embodiment. FIG. 23 illustrates time slot allocation processing by the radio resource allocation release system according to an exemplary embodiment. FIG. 24 illustrates time slot release processing by the radio resource allocation release system according to an exemplary embodiment.

A time slot allocation processing by the radio resource allocation release system is shown in FIG. 23, when the own vehicle enters the road-vehicle area from the vehicle-vehicle area, the in-vehicle equipment 20b of the radio resource allocation release system 1b detects the road-vehicle service area end detection facility by the sensor (operation S501 and operation S502) and recognizes service-in, and then transmits the service area-in notification signal to the roadside equipment (operation S503 and operation S504).

The roadside equipment 10b performs the allocation processing of the time slot for the vehicle-vehicle communication for the vehicle (operation S505). When the time slot area is determined (operation S506), the roadside equipment 10b notifies each in-vehicle equipment 20b of the time slot allocation area notification for notifying this area by the broadcast signal (operation S507).

As with the previously disclosed embodiment, the in-vehicle equipment 20b recognizes the time slot area (operation S508 and operation S509), and then transmits the response indicating that the time slot allocation notification is received (operation S510 and operation S511). Each of the in-vehicle equipment 20b performs the vehicle-vehicle communication with each other by using the time slot allocated by the roadside equipment 10b (operation S512 to operation S515).

A time slot release processing by the radio resource allocation release system is shown in FIG. 24, when the in-vehicle equipment 20b of the radio resource allocation release system 1b passes through the road-vehicle end detection facility 30, the in-vehicle equipment 20b detects this facility by the sensor (operation S601 and operation S602), and then recognizes service-out. The in-vehicle equipment 20b transmits the service area-out notification signal to the roadside equipment 10b (operation S603 and operation S604). When the service area-out notification signal is notified from the in-vehicle equipment 20a, the roadside equipment 10a immediately performs the time slot release processing (operation S605).

According to an exemplary embodiment, the road-vehicle service area end detection facility 30 may be detected by the in-vehicle equipment sensor, and then the detection notified to the roadside equipment 10b by the in-vehicle equipment 20b. This makes it possible to accurately recognize the service area end and to allocate the time slot to the vehicle that provides service-in. This is an effective method because it is difficult to obtain the location information by the GPS or the like when the road-vehicle area end is provided at an entrance or an exit of a tunnel.

The road-vehicle service area end detection facility 30 may be detected by the in-vehicle equipment sensor, and then this detection is notified to the roadside equipment 10b by the in-vehicle equipment 20b. This makes it possible to accurately recognize the service area end and to release the time slot to the vehicle that provides service-out. Thus, it is possible to prevent the time slot from being depleted.

The radio resource allocation releasing method may be achieved by executing a program that is provided in advance by a computer such as a personal computer and a workstation. This program may be distributed through a network such as Internet. The program may be stored in a computer readable recording medium such as a hard disk, a flexible disk (FD), a CD-ROM, an MO, and a DVD, and may be performed by being read from the recording medium by a computer. The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Although the embodiments of the present inventions have been described in detail, it should be understood that the various changes, substitutions, and alterations could be made hereto without departing from the sprit and scope and scope of the invention. Further, according to an aspect of the embodiments, any combinations of the described features, functions and/or operations can be provided. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A radio resource allocation system in which a roadside equipment placed on a road allocates a radio resource to an in-vehicle equipment that exists in a given area where the in-vehicle equipment mounted on a vehicle communicates with another in-vehicle equipment by using the allocated radio resource, the radio resource allocation system comprising:

the in-vehicle equipment comprising a signal transmitting unit that transmits a signal showing that the own vehicle exists in the given area, and the, roadside equipment comprising:

a radio resource allocation unit that allocates a time slot as the radio resource to the in-vehicle equipment so as to permit the in-vehicle equipment to communicate with the another in-vehicle equipment when the roadside equipment receives the signal transmitted by the signal transmitting unit and notifies each in-vehicle equipment of the allocation of the time slot by a broadcast signal, the each in-vehicle equipment existing in the given area, and a radio resource release unit that releases the time slot as the radio resource when the roadside equipment does not receive the signal from the in-vehicle equipment allocated the time slot as the radio resource by the radio resource allocation unit.

2. The radio resource allocation system according to claim 1, wherein the roadside equipment further comprises a health check signal transmitting unit that regularly transmits a health check signal for checking a communication state of the in-vehicle equipment, the signal transmitting unit transmits a response signal, as a signal showing that the own vehicle exists in the given area, to respond to the health check signal transmitted from the roadside equipment, the radio resource allocation unit allocates the time slot as the radio resource to the in-vehicle equipment when the radio resource allocation unit receives the response signal to respond to the health check signal transmitted by the signal transmitting unit, and the radio resource release unit releases the time slot as the radio resource when the radio resource release unit does not receive the response signal to respond to the health check signal from the in-vehicle equipment allocated the time slot as the radio resource by the radio resource allocation unit.

3. A radio resource allocation system in which a roadside equipment placed on a road allocates a radio resource to an in-vehicle equipment that exists in a given area where the in-vehicle equipment mounted on a vehicle communicates with another in-vehicle equipment by using the allocated radio resource, the radio resource allocation system comprising:

the in-vehicle equipment has a location information transmitting unit that transmits location information of the own vehicle, and the roadside equipment comprising:

an area determination unit that determines, based on the location information transmitted by the location information transmitting unit, whether or not the in-vehicle equipment exists in the given area;

a radio resource allocation unit that allocates a time slot as the radio resource to the in-vehicle equipment so as to permit the in-vehicle equipment to communicate with the another in-vehicle equipment when the area determination unit determines that the in-vehicle equipment exists in the given area and notifies each in-vehicle equipment of the allocation of the time slot by a broadcast signal, the each in-vehicle equipment existing in the given area; and a radio resource release unit that releases the time slot as the radio resource when the area determination unit determines that the in-vehicle equipment allocated the time slot as the radio resource does not exist in the given area.

4. The radio resource allocation system according to claim 3, wherein the in-vehicle equipment further comprises a location information receiving unit that receives the location information from a GPS, and the location information transmitting unit transmits, to the roadside equipment, the location information received from the GPS by the location information receiving unit.

5. A radio resource allocation system in which a roadside equipment placed on a road allocates a radio resource to an in-vehicle equipment that exists in a given area where the in-vehicle equipment mounted on a vehicle communicates with another in-vehicle equipment by using the allocated radio resource, the radio resource allocation system comprising:

the in-vehicle equipment comprising:

an in-vehicle equipment detection unit that detects passage of an area end device placed at an end of the given area; and a passage notifying unit that notifies the roadside equipment of passage information related to the passage of the area end device detected by the in-vehicle equipment detection unit, and the roadside equipment comprising:

an area determination unit that determines, based on the passage information transmitted by the location information transmitting unit, whether or not the in-vehicle equipment exists in the given area;

a radio resource allocation unit that allocates a time slot as the radio resource to the in-vehicle equipment so as to permit the in-vehicle equipment to communicate with the another in-vehicle equipment when the area determination unit determines that the in-vehicle equipment exists in the given area and notifies each in-vehicle equipment of the allocation of the time slot by a broadcast signal, the each in-vehicle equipment existing in the given area; and a radio resource release unit that releases the time slot as the radio resource when the area determination unit determines that the in-vehicle equipment allocated the time slot as the radio resource does not exist in the given area.

6. A roadside equipment that allocates a radio resource to an in-vehicle equipment that exists in a given area where the in-vehicle equipment mounted on a vehicle communicates with another in-vehicle equipment by using the allocated radio resource, the roadside equipment comprising:

a radio resource allocation unit that allocates a time slot as the radio resource to the in-vehicle equipment so as to permit the in-vehicle equipment to communicate with the another in-vehicle equipment when the roadside equipment receives a signal, transmitted from the in-vehicle equipment, showing that the in-vehicle equipment exists in the given area and notifies each in-vehicle equipment of the allocation of the time slot by a broadcast signal, the each in-vehicle equipment existing in the given area; and a radio resource release unit that releases the time slot as the radio resource when the roadside equipment does not receive the signal from the in-vehicle equipment allocated the time slot as the radio resource by the radio resource allocation unit.

7. A method of allocating radio resource by which a roadside equipment placed on a road allocates a radio source to an in-vehicle equipment that exists in a given area where the in-vehicle equipment communicates with another in-vehicle equipment by using the allocated radio source, the method comprising:

transmitting a signal showing that the own vehicle exists in the given area to the roadside equipment;

allocating a time slot as the radio resource to the in-vehicle equipment so as to permit the in-vehicle equipment to communicate with the another in-vehicle equipment based on reception of the signal transmitted from the in-vehicle equipment, notifying each in-vehicle equipment of the allocation of the time slot by a broadcast signal, the each in-vehicle equipment existing in the given area; and releasing the time slot as the radio resource when the roadside equipment does not receive the signal from the in-vehicle equipment allocated the time slot as the radio resource by allocation of the radio resource time slot.

8. A non-transitory computer-readable recording medium stores therein a computer program that causes a roadside equipment placed on a road allocates a radio source to an in-vehicle equipment that exists in a given area where the in-vehicle equipment communicates with another in-vehicle equipment by using the allocated radio source to execute operations comprising:

transmitting a signal showing that the own vehicle exists in the given area to the roadside equipment;

allocating a time slot as the radio resource to the in-vehicle equipment so as to permit the in-vehicle equipment to communicate with the another in-vehicle equipment based on reception of the signal transmitted from the in-vehicle equipment, notifying each in-vehicle equipment of the allocation of the time slot by a broadcast signal, the each in-vehicle equipment existing in the given area; and releasing the time slot as the radio resource when the roadside equipment does not receive the signal from the in-vehicle equipment allocated the radio resource by allocation of the radio resource time slot.

9. The radio resource allocation system according to claim 1, wherein when the given area is determined, the roadside equipment notifies each in-vehicle equipment of the given area by the broadcast signal.

* * * * *